United States Patent
Hussain et al.

(10) Patent No.: US 11,461,384 B2
(45) Date of Patent: Oct. 4, 2022

(54) FACIAL IMAGES RETRIEVAL SYSTEM

(71) Applicant: Algomus, Inc., Troy, MI (US)

(72) Inventors: Amjad Hussain, Bloomfield Hills, MI (US); Taleb Alashkar, Royal Oak, MI (US); Vijay Gunasekaran, Royal Oak, MI (US)

(73) Assignee: ALGOFACE, INC., Carefree, AZ (US)

( * ) Notice: Subject to any disclaimer, the term of this patent is extended or adjusted under 35 U.S.C. 154(b) by 470 days.

(21) Appl. No.: 16/565,198

(22) Filed: Sep. 9, 2019

(65) Prior Publication Data

US 2020/0081913 A1    Mar. 12, 2020

Related U.S. Application Data

(60) Provisional application No. 62/729,194, filed on Sep. 10, 2018.

(51) Int. Cl.
| | |
|---|---|
| G06F 16/583 | (2019.01) |
| G06K 9/62 | (2022.01) |
| G06F 40/20 | (2020.01) |
| G06T 7/10 | (2017.01) |
| G06F 17/16 | (2006.01) |
| G06N 3/04 | (2006.01) |
| G06V 40/16 | (2022.01) |

(52) U.S. Cl.
CPC ............ G06F 16/583 (2019.01); G06F 17/16 (2013.01); G06F 40/20 (2020.01); G06K 9/6215 (2013.01); G06N 3/0454 (2013.01); G06T 7/10 (2017.01); G06V 40/162 (2022.01); G06V 40/172 (2022.01)

(58) Field of Classification Search
CPC ........ G06F 16/583; G06F 40/20; G06F 17/16; G06T 7/10; G06K 9/00234; G06K 9/00288; G06K 9/6215; G06N 3/0454
See application file for complete search history.

(56) References Cited

U.S. PATENT DOCUMENTS

| | | | | |
|---|---|---|---|---|
| 8,571,332 | B2 * | 10/2013 | Kumar ................. | G06K 9/6269 382/224 |
| 2010/0135584 | A1 * | 6/2010 | Tang .................... | G06F 16/583 382/218 |
| 2013/0136319 | A1 * | 5/2013 | Vanhoucke ........ | G06K 9/00375 382/118 |
| 2018/0204111 | A1 * | 7/2018 | Zadeh ................. | G06N 3/0436 |
| 2018/0314880 | A1 * | 11/2018 | Fadeev ............... | G06F 16/9535 |

FOREIGN PATENT DOCUMENTS

| | | | | | |
|---|---|---|---|---|---|
| CN | 106560810 | A | * | 4/2017 | ......... G06F 3/04842 |
| CN | 110991210 | A | * | 4/2020 | |

OTHER PUBLICATIONS

Guangcan et al. 2017, "On the Reconstruction of Face IMages from Deep Face Templates", pp. 11-13 (Year: 2017).*

* cited by examiner

*Primary Examiner* — Matthew J Ellis

(74) *Attorney, Agent, or Firm* — Buckert Patent & Trademark Law Firm, P.C.; John F. Buckert

(57) ABSTRACT

A facial images retrieval system is provided. The facial images retrieval system is adapted to receive an initial textual description of a facial image to perform an initial facial image search that obtains a plurality of facial images based on the textual description. The facial images retrieval system then receives a selection of the first and second facial images that are relatively close to a desired facial image to perform a further facial image search to obtain another facial image.

13 Claims, 25 Drawing Sheets

FACIAL IMAGES RETRIEVAL SYSTEM

CROSS-REFERENCE TO RELATED APPLICATIONS

This application claims priority to U.S. Provisional Patent Application No. 62/729,194 filed on Sep. 10, 2018, the entire contents of which are hereby incorporated by reference herein.

BACKGROUND

The inventors herein have recognized a need for improved facial image retrieval system.

In particular, the inventors herein have recognized a need for a system that receives an initial textual description of a facial image to perform an initial facial image search to obtain a plurality of facial images based on the textual description, and then to receive a selection of at least first and second facial images that are relatively close to a desired facial image to perform further facial image searching to obtain another facial image.

Further, the inventors herein have recognized a need for a system that receives an initial textual description of a facial image to perform an initial facial image search to obtain a plurality of facial images based on the textual description, and then to allow modification of one of the facial images to obtain a modified facial image that is closer to a desired image, to perform further facial image searching based on the modified facial image to obtain another facial image.

Further, the inventors herein have recognized a need for a system that receives an initial textual description of a facial image to perform an initial facial image search to obtain a plurality of facial images based on the textual description, and then to receive a modified textual description and a selection of one of the facial images to perform further facial image searching to obtain another facial image.

SUMMARY

A facial images retrieval system in accordance with an exemplary embodiment is provided. The facial images retrieval system includes a display device and a computer operably coupled to the display device. The computer receives a first textual description of a facial image. The computer determines a first similarity score associated with the first textual description and a first facial image, and a second similarity score associated with the first textual description and a second facial image. The computer instructs the display device to display the first and second facial images thereon. The computer receives a user selection of the first and second facial images to perform further facial image searching. The computer determines a third similarity score associated with the first facial image and a third facial image, and a fourth similarity score associated with the second facial image and the third facial image. The similarity scorer module calculates a weighted average of the third and fourth similarity scores to determine a final similarity score of the third facial image. The computer instructs the display device to display the third facial image and the final similarity score thereon.

A facial images retrieval system in accordance with another exemplary embodiment is provided. The facial images retrieval system includes a display device and a computer operably coupled to the display device. The computer receives a first textual description of a facial image. The computer determines a first similarity score associated with the first textual description and a first facial image, and a second similarity score associated with the first textual description and a second facial image. The computer instructs the display device to display the first and second facial images thereon. The computer receives a user instruction to modify soft-biometric attributes of the first facial image to obtain a first modified facial image to perform further facial image searching. The computer determines a third similarity score associated with the first modified facial image and a third facial image. The computer instructs the display device to display the third facial image and the final similarity score thereon.

A facial images retrieval system in accordance with another exemplary embodiment is provided. The facial images retrieval system includes a display device and a computer operably coupled to the display device. The computer receives a first textual description of a facial image. The computer determines a first similarity score associated with the first textual description and a first facial image, and a second similarity score associated with the first textual description and a second facial image. The computer instructs the display device to display the first and second facial images thereon. The computer receives a user selection of the first facial image and the textual description to perform further facial image searching. The computer determines a third similarity score associated with the first facial image and a third facial image, and a fourth similarity score associated with a second textual description and the third facial image. The similarity scorer module calculates a weighted average of the third and fourth similarity scores to determine a final similarity score of the third facial image. The computer instructs the display device to display the third facial image and the final similarity score thereon.

DETAILED DESCRIPTION

Figure 1:
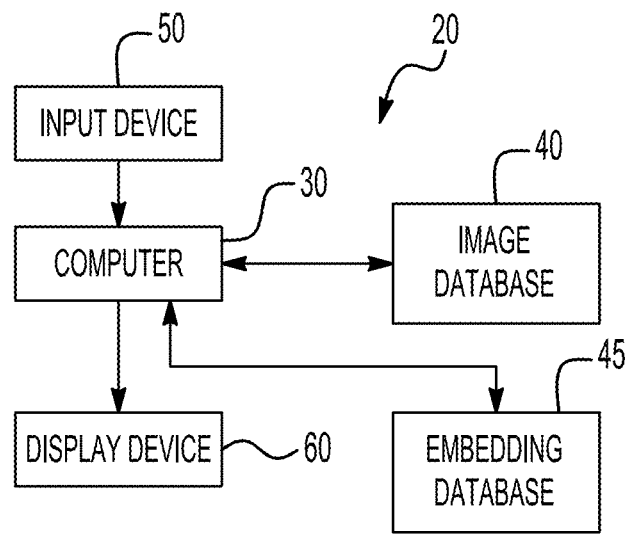
FIG. 1 is a block diagram of a facial images retrieval system in accordance with an exemplary embodiment.
Figure 2:
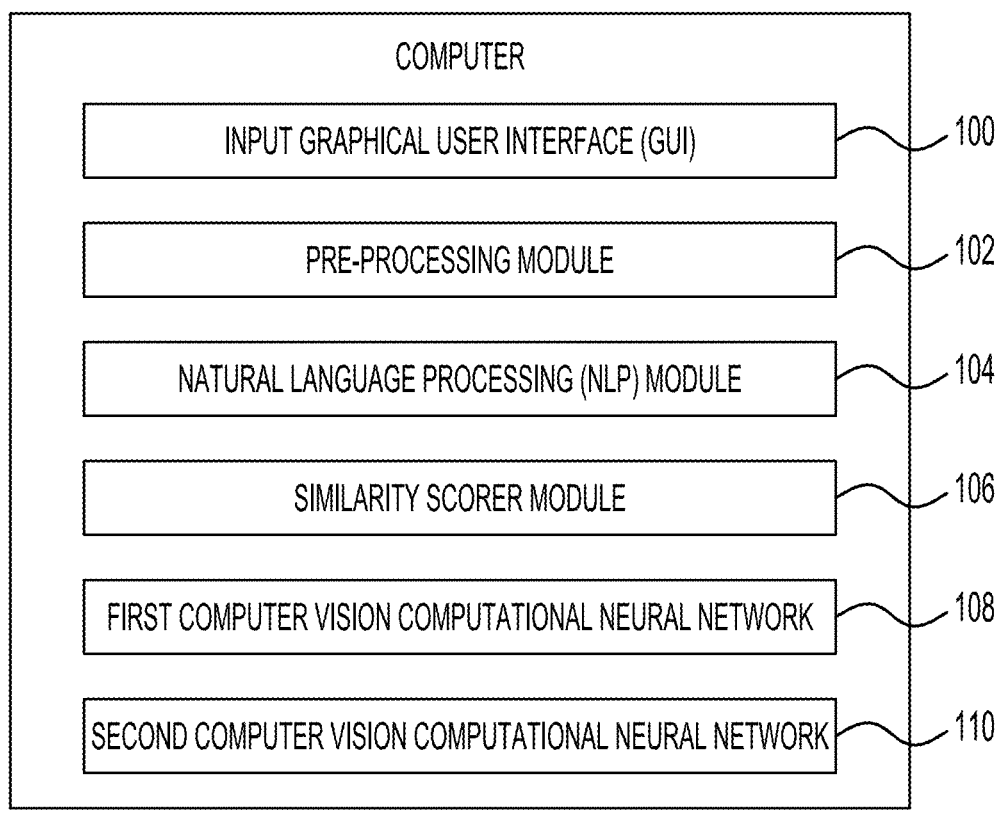
FIG. 2 is a block diagram of a computer in the facial images retrieval system of FIG. 1 having an input graphical user interface, a pre-processing module, a natural language processing module, a similarity scorer module, a first computer vision computational neural network, and a second computer vision computational neural network.
Figure 3:
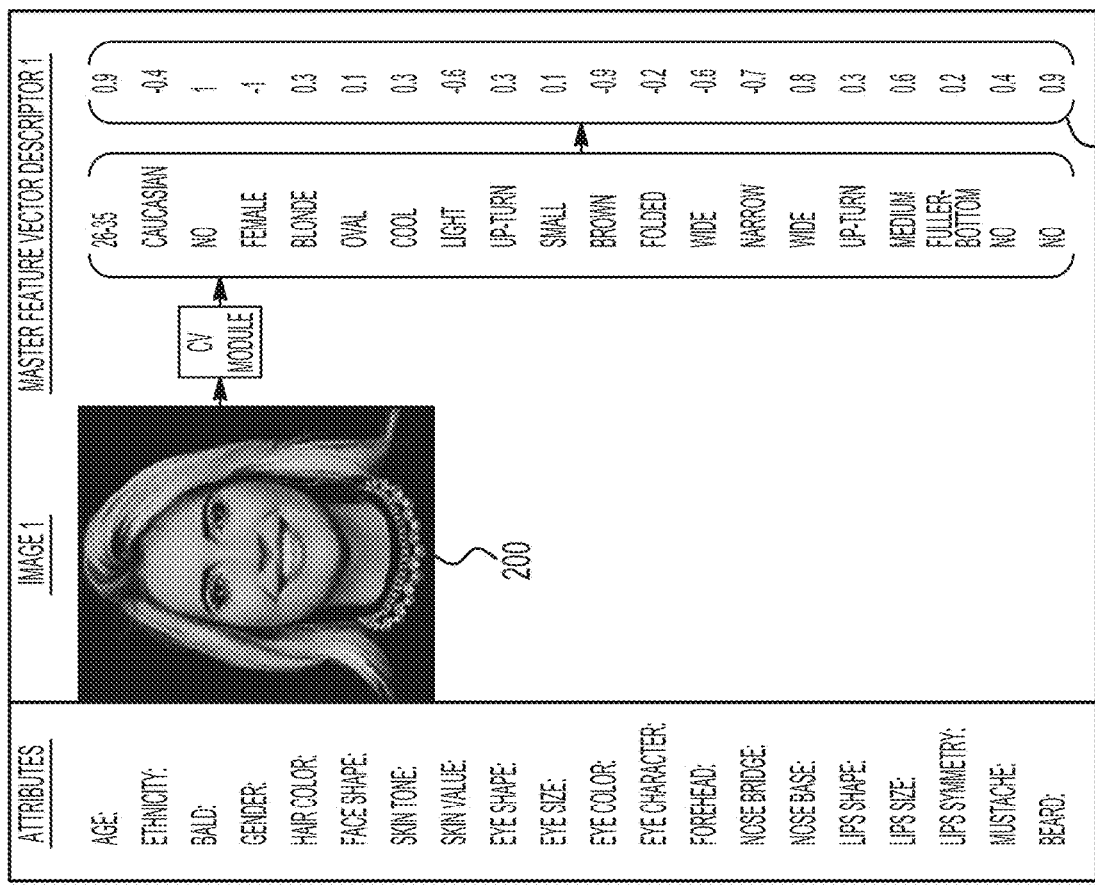
FIG. 3 is a schematic of a first facial image and a master feature vector descriptor that describes attributes of the first facial image.
Figure 4:
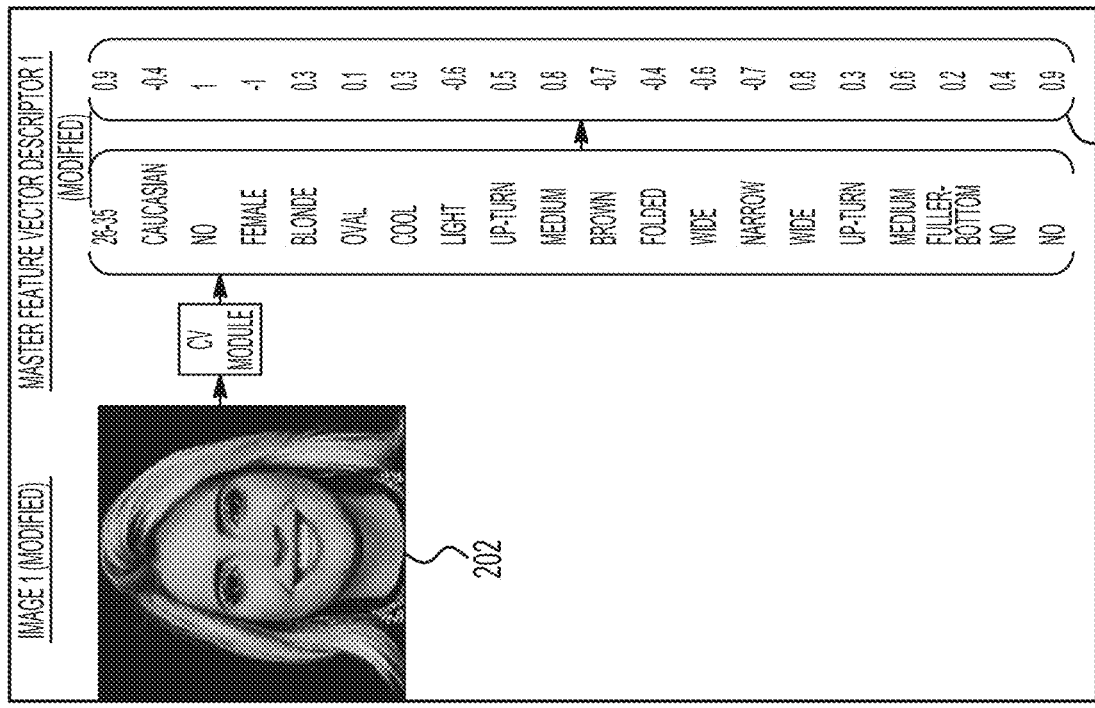
FIG. 4 is a schematic of a second facial image and a master feature vector descriptor that describes attributes of the second facial image.
Figure 6:
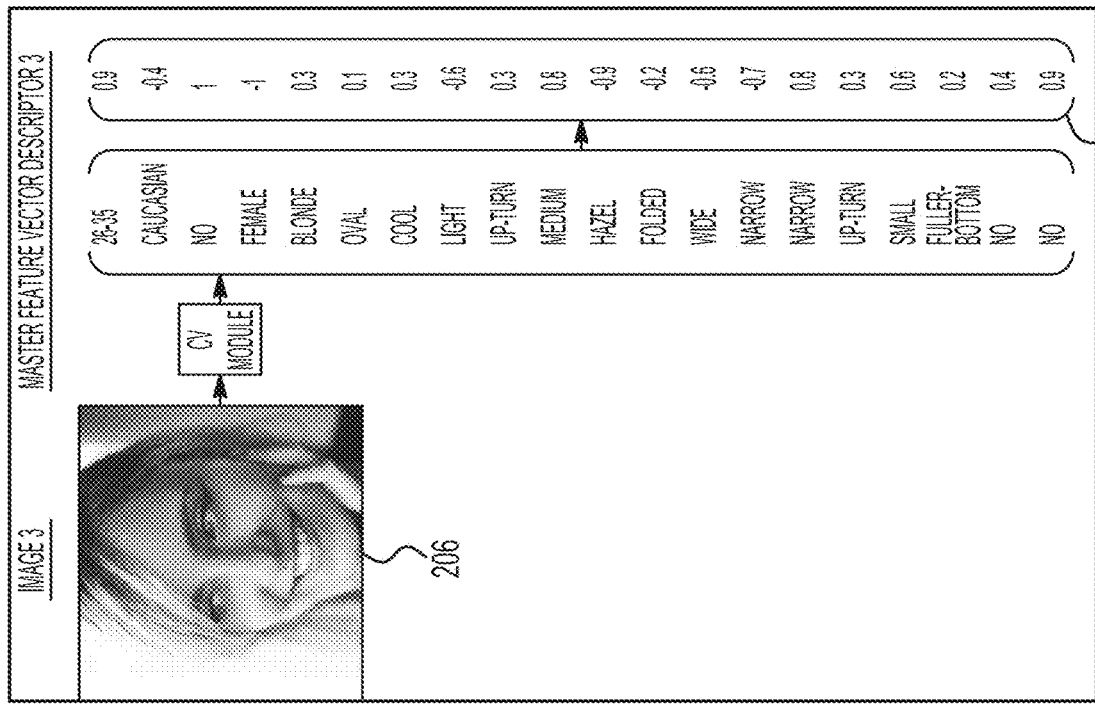
FIG. 6 is a schematic of a fourth facial image and a master feature vector descriptor that describes attributes of the fourth facial image.
Figure 5:
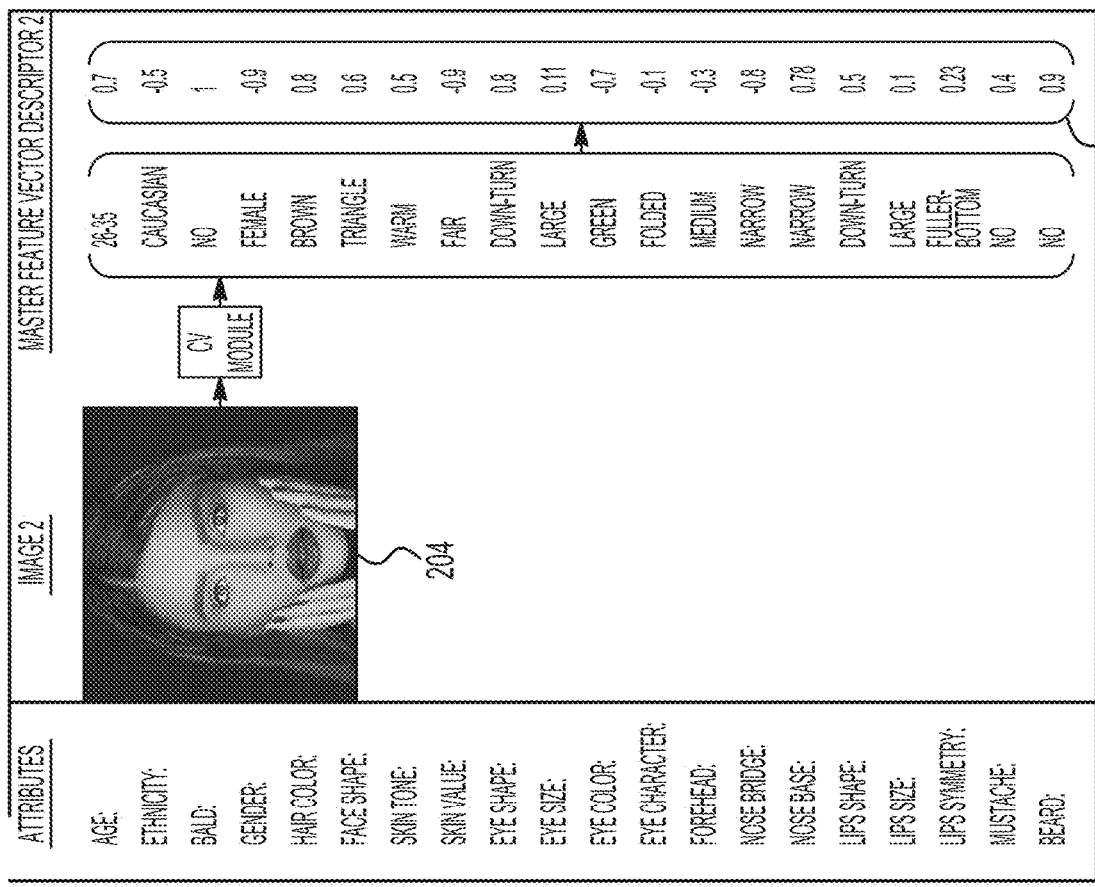
FIG. 5 is a schematic of a third facial image and a master feature vector descriptor that describes attributes of the third facial image.

Referring to FIGS. 1 and 2, a facial images retrieval system 20 in accordance with an exemplary embodiment is provided. The facial images retrieval system 20 includes a computer 30, an image database 40, an embedding database 45, an input device 50, and a display device 60.

The computer 30 is operably coupled to the input device 50, the display device 60, the image database 40, and the embedding database 45. The computer 30 includes an input graphical user (GUI) interface 100, a pre-processing module 102, a natural language processing (NLP) module 104, a similarity scorer module 106, a first computer vision computational neural network 108, a second computer vision computational neural network 110, which will be described in greater detail below.

The input device 50 is provided to receive user selections for controlling operation of the computer 30. The display device 60 is provided to display the GUI 100 and facial images in response to instructions received from the computer 30.

Referring to FIGS. 1 and 3-6, the image database 40 is provided to store a plurality of facial images therein. In particular, the image database 40 stores the facial image 200 (shown in FIG. 3), the facial image 202 (shown in FIG. 4), the facial image 204 (shown in FIG. 5), and the facial image 206 (shown in FIG. 6). In an exemplary embodiment, the image database 40 stores a plurality of additional facial images therein.

Referring to FIGS. 1 and 3-6, the embedding database 45 is provided to store a plurality of master feature vector descriptors therein. Each master feature vector descriptor is associated with a facial image in the image database 40 and have numbers that describe soft-biometric attributes and features of the facial image. In particular, the embedding database 45 stores a master feature vector descriptor 300 (shown in FIG. 3) having numbers that describe attributes and features of the facial image 200. For example, the master feature vector descriptor 300 includes a number 0.9 which corresponds to an age range of 26-35 and the facial features for the woman identified in the facial image 200. Further, the embedding database 45 stores a master feature vector descriptor 302 (shown in FIG. 4) having numbers that describe attributes and features of the facial image 202. Further, the embedding database 45 stores a master feature vector descriptor 304 (shown in FIG. 5) having numbers that describe attributes and features of the facial image 204. Further, the embedding database 45 stores a master feature vector descriptor 306 (shown in FIG. 6) having numbers that describe attributes and features of the facial image 206.

Figure 28:
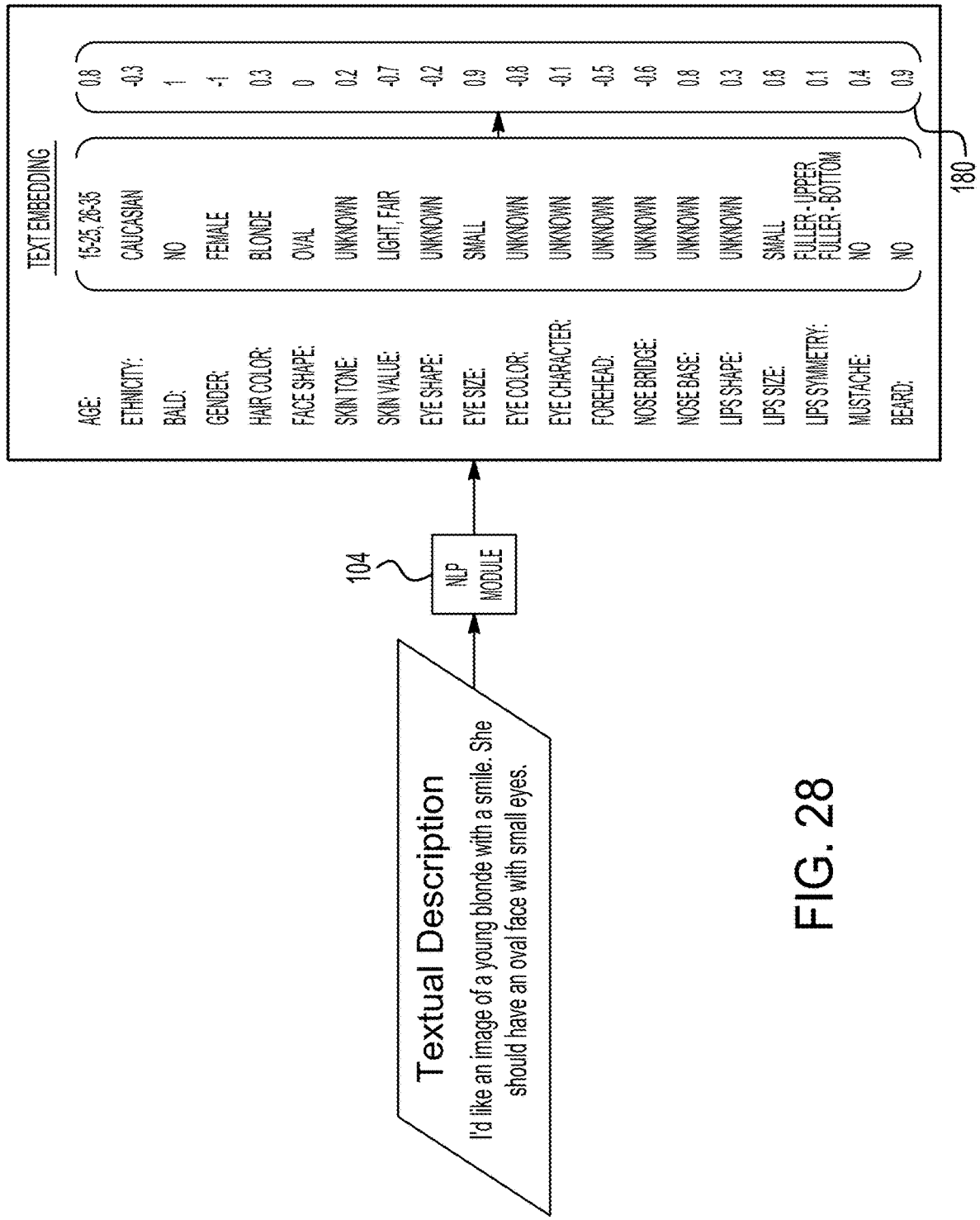
FIG. 28 is a block diagram illustrating that the NLP module converts a textual description to a textual feature vector.

Referring to FIG. 28, the NLP module 100 receives a textual description of a desired facial image and converts the textual description to a textual feature vector which has numbers that describes attributes in the desired facial image with respect to the textual description. The textual feature vector is compared to master feature vector descriptors associated with facial images to determine similarity scores.

An advantage of the facial images retrieval system 20 is that the system 20 is adapted to receive an initial textual description of a facial image to perform an initial facial image search to obtain a plurality of facial images based on the textual description, and then to receive a selection of first and second facial images that are relatively close to a desired facial image to perform a further facial image search to obtain another facial image.

Another advantage of the facial images retrieval system 20 is that the system 20 is adapted to receive an initial textual description of a facial image to perform an initial facial image search to obtain a plurality of facial images based on the textual description, and then to receive user instructions to modify one of the facial images to obtain a modified mage that is closer to a desired image, and to perform another facial image search based on the modified image to obtain another facial image.

Another advantage of the facial images retrieval system 20 is that the system 20 is adapted to receive an initial textual description of a facial image to perform an initial facial image search that obtains a plurality of facial images based on the textual description, and then to receive another textual description and a selection of one of the facial images to perform a further facial image search to obtain another facial image.

For purposes of understanding, a few technical terms used herein will now be explained.

The term "feature" is a recognizable pattern that is consistently present in a facial image. An exemplary feature is a hair style.

The term "attribute" is an aggregate of a set of features determined by a plurality of features in a facial image. Exemplary attributes include age, ethnicity, bald, gender, hair color, face shape, skin tone, skin value, eye shape, eye size, eye color, eye character, forehead, nose bridge, lip shape, lip size, lip symmetry, mustache, and beard.

Referring to FIGS. 7-10, a description of the input GUI 100 for implementing a first method for searching for facial images utilizing the facial images retrieval system 20 will be explained. During the first method, the input GUI 100 receives an initial textual description of a facial image to perform an initial facial image search to obtain a plurality of facial images based on the textual description, and then receives a selection of the first and second facial images (that are relatively close to a desired facial image) to perform a further facial image search to obtain another facial image.

Figure 7:
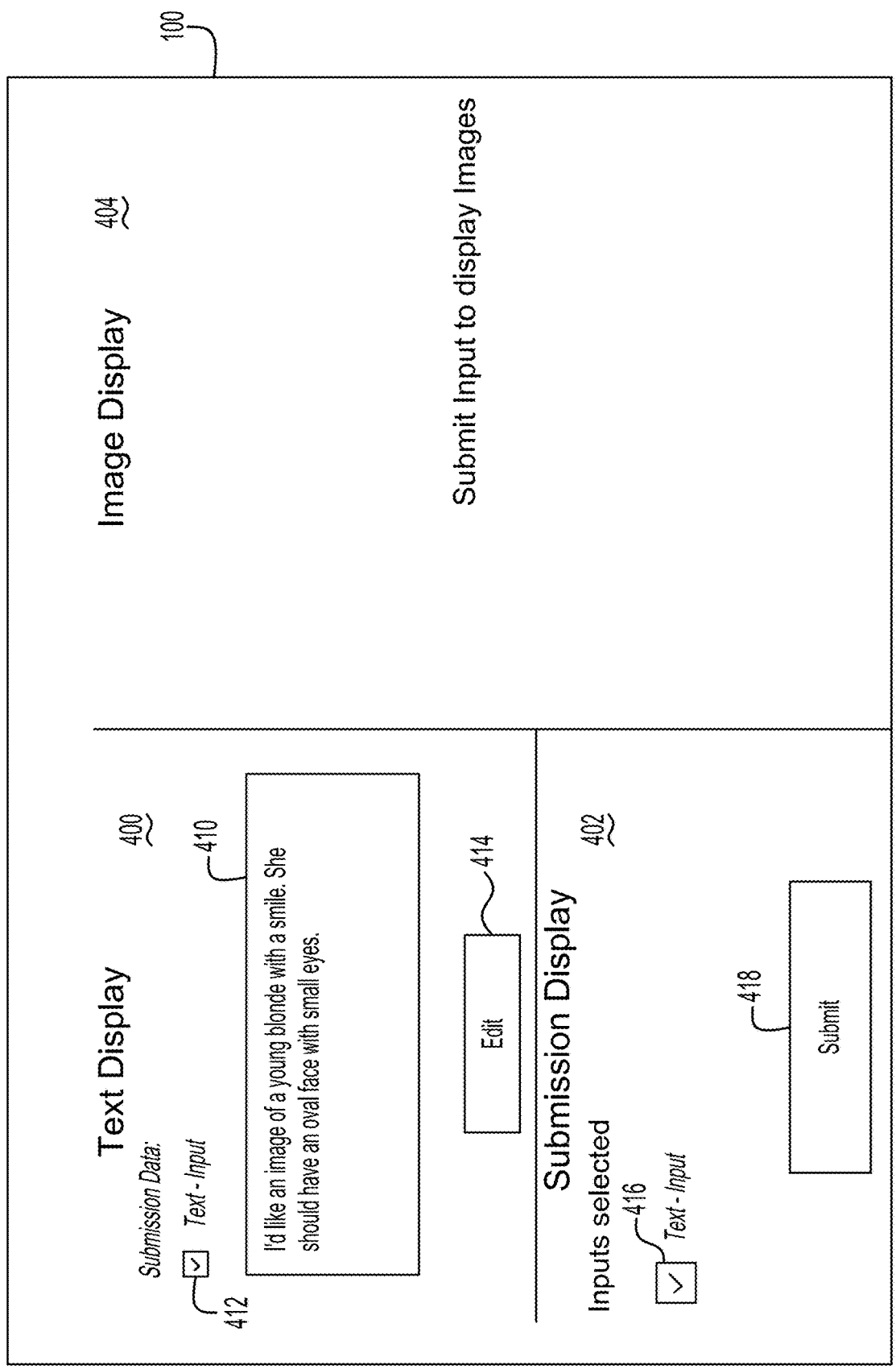
FIG. 7 is a schematic of a graphical user interface utilized by the system of FIG. 1 for implementing a first method for searching for facial images.

Referring to FIG. 7, the input GUI 100 includes a text display region 400, a submission display region 402, and an image display region 404. The input device 50 is utilized to make the user selections and inputted data in the input GUI 100.

The text display region 400 includes a text input box 410, a text selection checkbox 412, and an edit command button 414. The text input box 410 allows a user to input a textual description for a desired image utilizing the input device 50. For example, an exemplary textual description recites: "I'd like an image of a young blonde with a smile. She should have an oval face with small eyes." The text selection checkbox 412 allows a user to indicate that a textual description is being input by the user and is to be used for a facial image search. The edit command button 414 allows the user to edit the textual description in the text input box 410.

The submission display region 402 includes a text selected message 416 and a submit command button 418. The text selected message 416 indicates that the text selection checkbox 412 has been selected indicating a textual description is being utilized for the facial image search. When the submit command button 418 is selected by the user, the computer 30 performs a facial image search and displays the search results as shown in FIG. 8.

Figure 8:
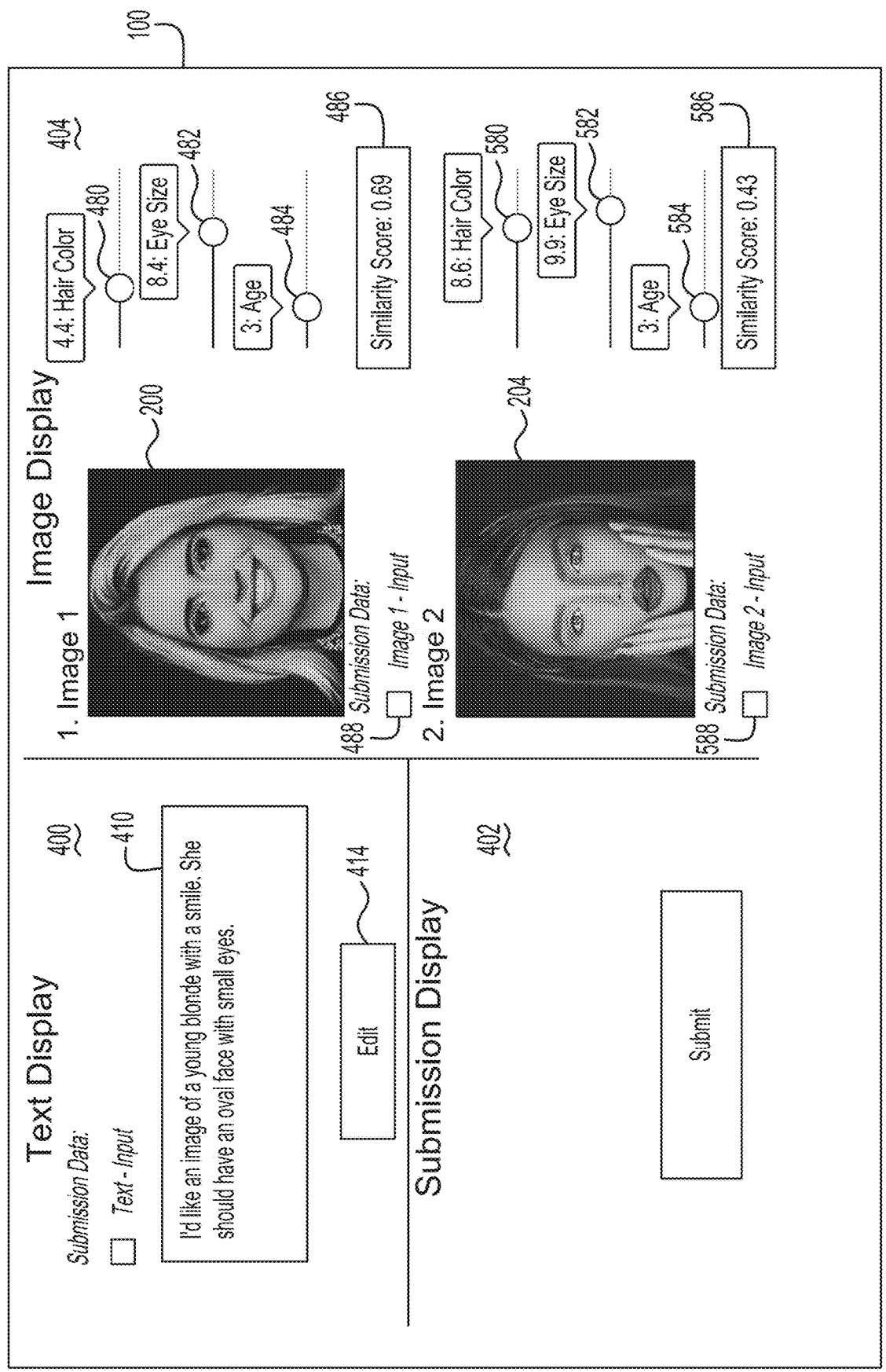
FIG. 8 is another schematic of the graphical user interface of FIG. 7.

Referring to FIG. 8, the image display region 404 includes a facial image 200 found during the facial image search that has one of the highest similarity scores. The image display region 404 further includes a hair color adjustment slider 480, an eye size adjustment slider 482, an age adjustment slider 484, a similarly score box 486, and an image selection checkbox 488 that are associated with the facial image 200. The hair color adjustment slider 480 allows a user to adjust the hair color of the facial image 200 for further facial image searching. The eye size adjustment slider 482 allows the user to adjust the eye size of the facial image 200 for further facial image searching. The age adjustment slider 484 allows the user to adjust the age of the face in the facial image 200 for further facial image searching. The similarly score box 486 indicates a similarity score between the facial image 200 and the textual description within the text input box 410. The image selection checkbox 488 allows a user to select whether to use the facial image 200 for further facial image searching.

The image display region 404 further includes a facial image 204 found during the facial image search that has one of the highest similarity scores. The image display region 404 further includes a hair color adjustment slider 580, an eye size adjustment slider 582, an age adjustment slider 584, a similarly score box 586, and an image selection checkbox 588 that are associated with the facial image 204. The hair color adjustment slider 580 allows a user to adjust the hair color of the facial image 204 for further facial image searching. The eye size adjustment slider 582 allows the user to adjust the eye size of the facial image 204 for further facial image searching. The age adjustment slider 584 allows the user to adjust the age of the face in the facial image 204 for further facial image searching. The similarly score box 586 indicates a similarity score between the facial image 204 and the textual description within the text input box 410. The image selection checkbox 588 allows a user to select whether to use the facial image 204 for further facial image searching.

Figure 9:
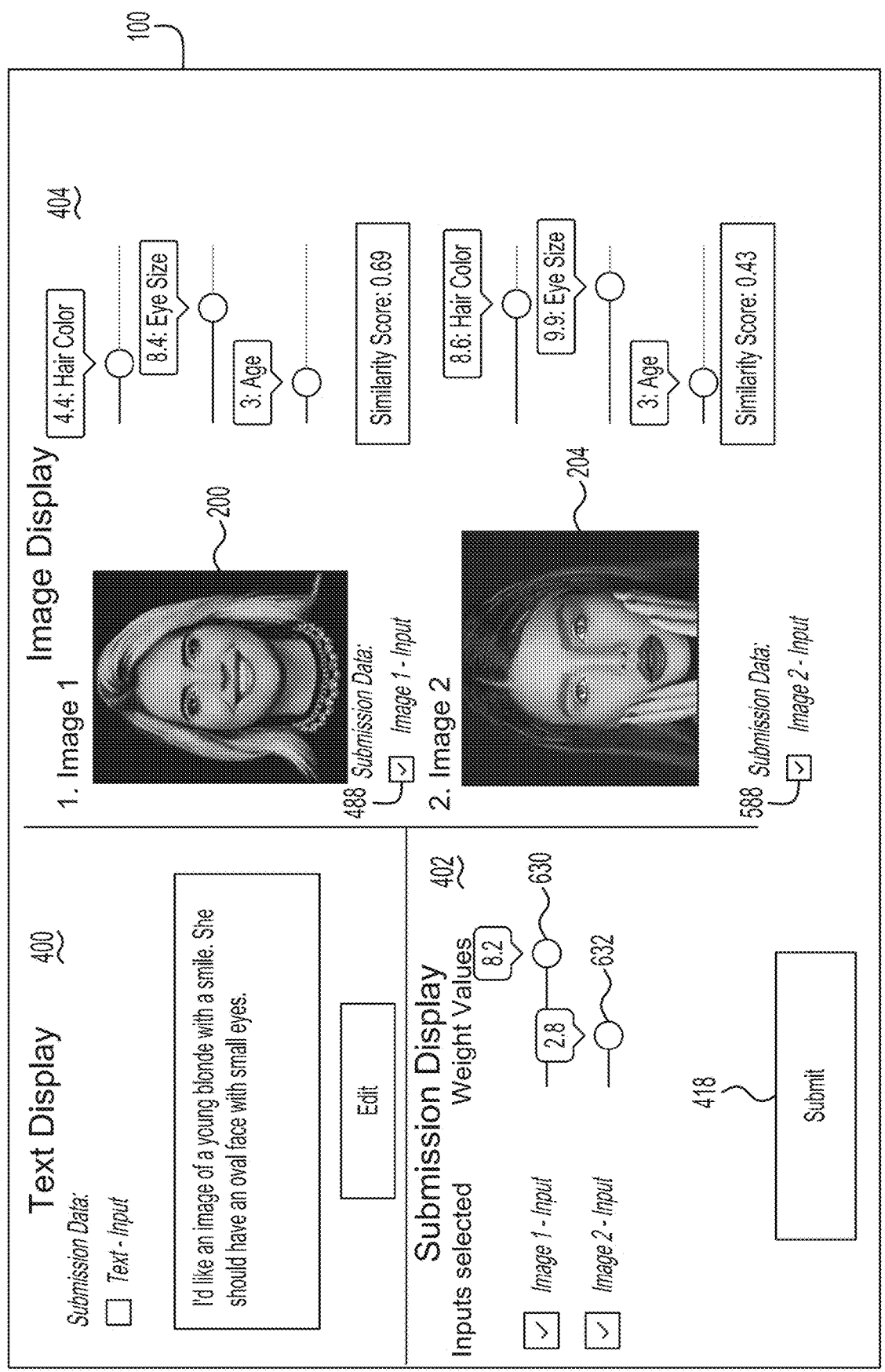
FIG. 9 is another schematic of the graphical user interface of FIG. 7.

Referring to FIG. 9, the image selection checkbox 488 has been selected which indicates that the facial image 200 is to be utilized for a further facial image search. Further, the image selection checkbox 588 has been selected which indicates that the facial image 204 is to be utilized for further facial image search.

The submission display region 402 includes a weighting value adjustment slider 630, a weighting value adjustment slider 632, and a submit command button 418. The weighting value adjustment slider 630 allows the user to select the weighting value that will be assigned to the facial image 200 for determining a weighted average similarity score associated with a new facial image found in a facial image search. The weighting value adjustment slider 630 allows the user to select the weighting value that will be assigned to the facial image 204 for determining the weighted average similarity score associated with a new facial image found in a facial image search. The submit command button 418 allows a user to instruct the computer 30 to perform the facial image search based on the facial image 200 and the facial image 204.

Figure 10:
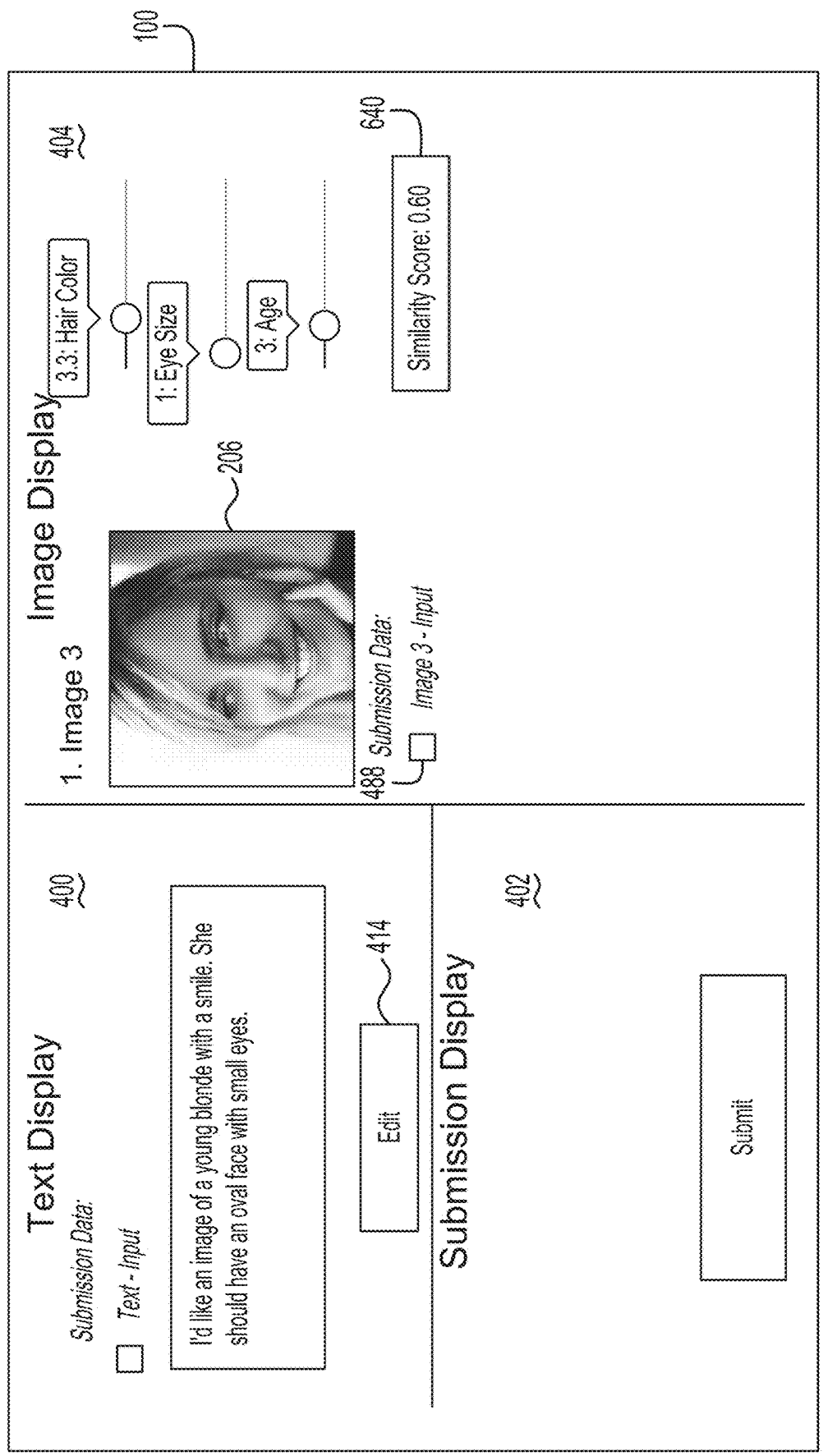
FIG. 10 is another schematic of the graphical user interface of FIG. 7.
Figure 11:
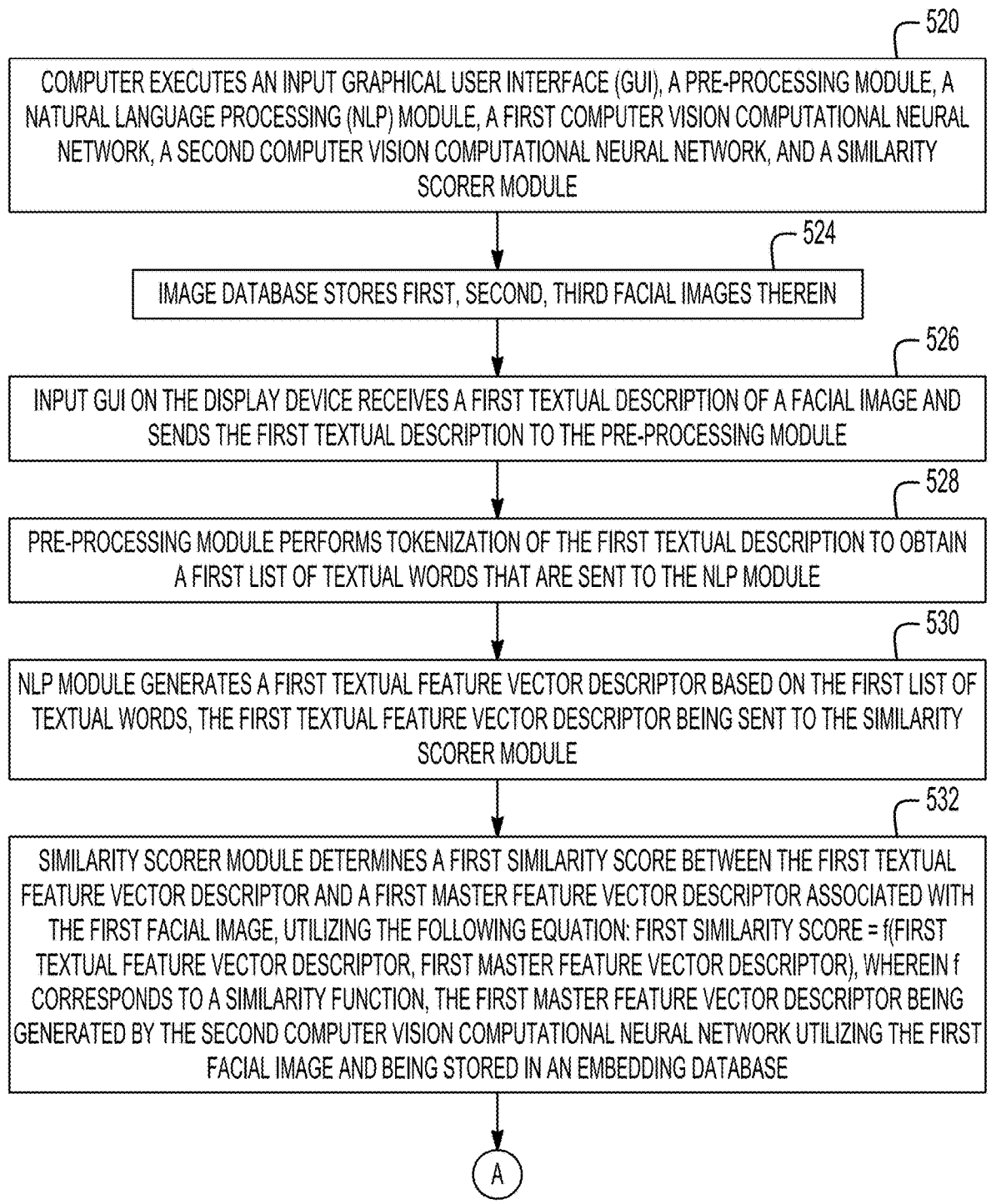
FIGS. 11-13 are flowcharts of a first method for searching for facial images utilizing the facial images retrieval system of FIG. 1.
Figure 12:
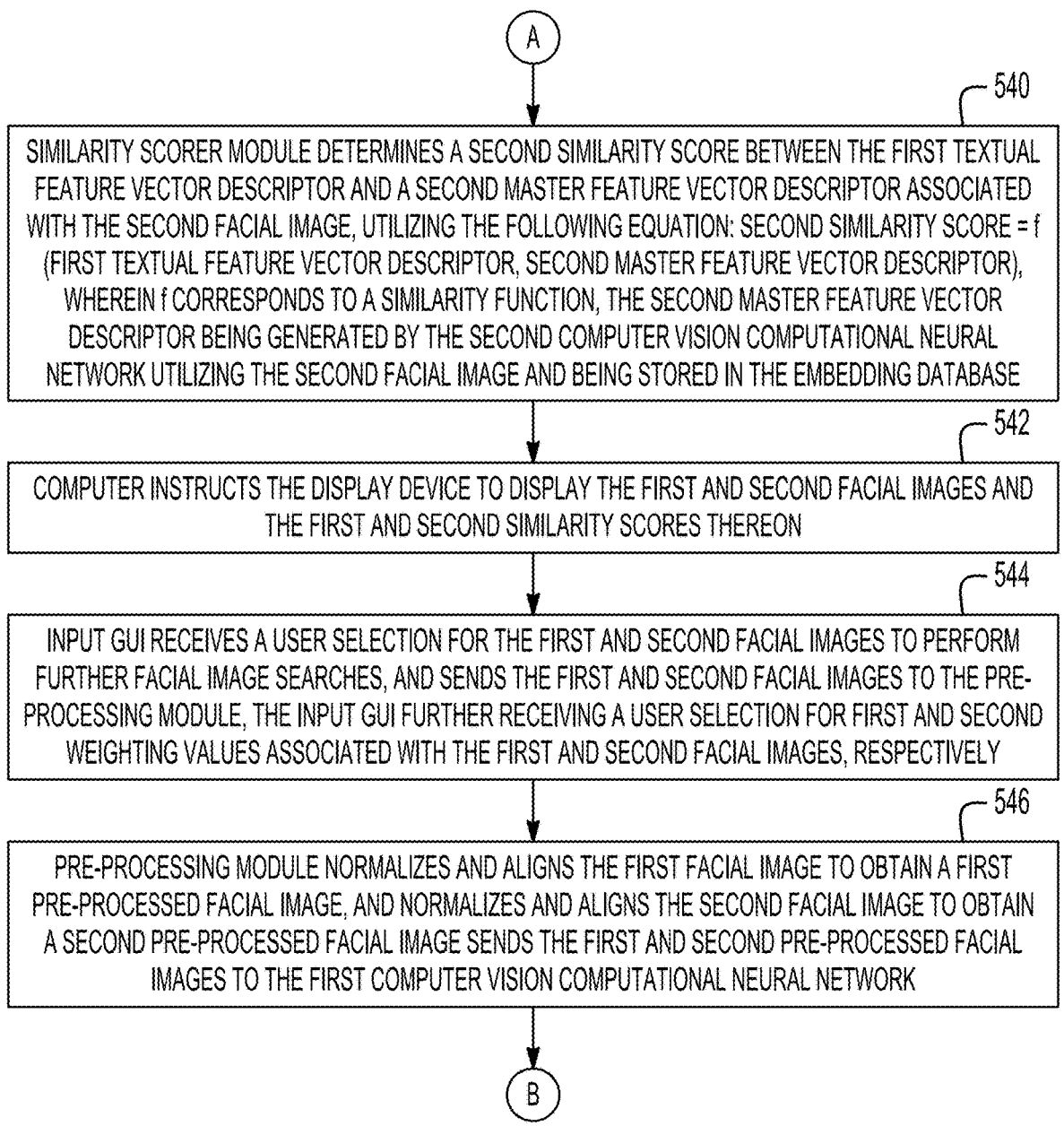
Figure 13:
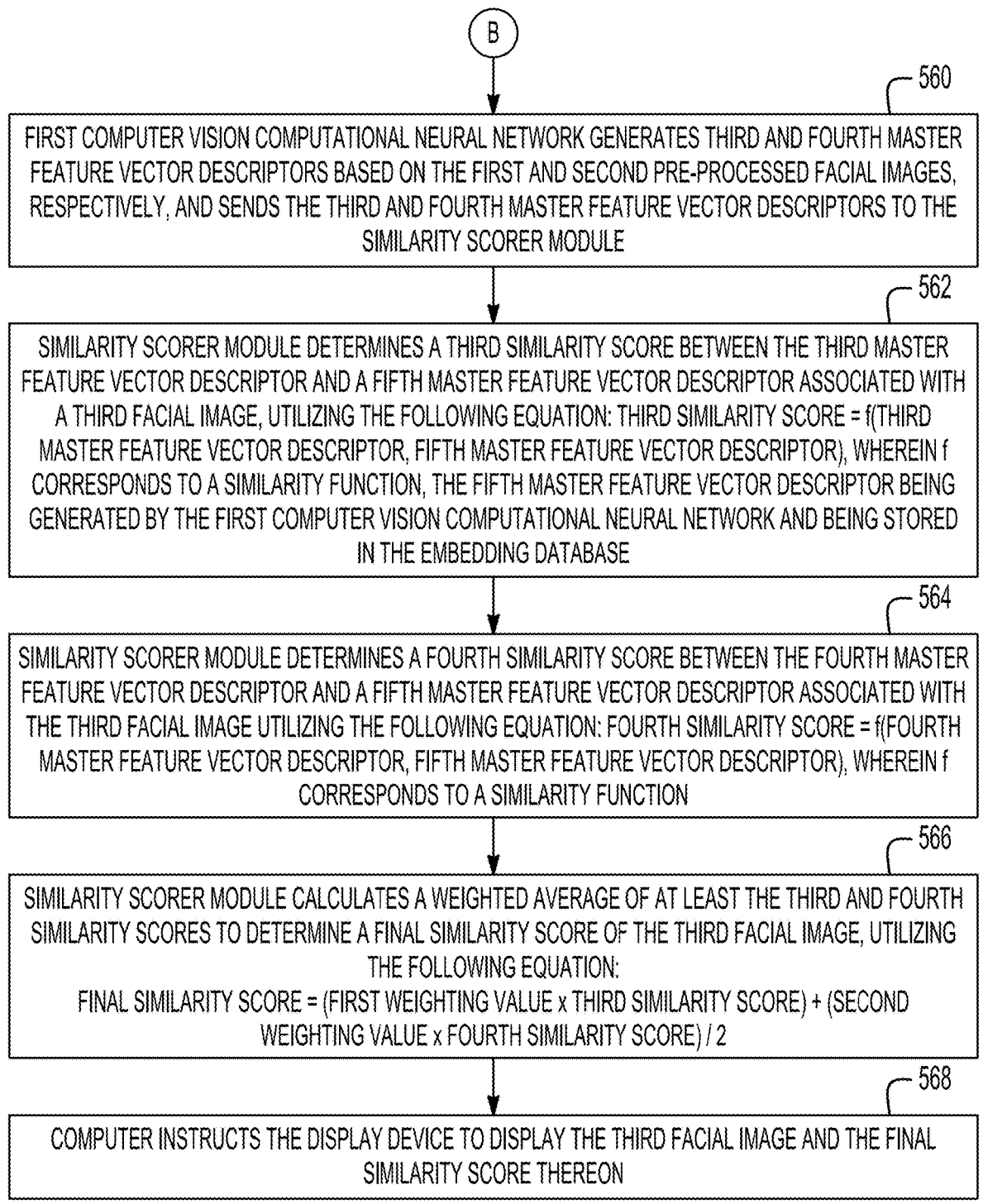

Referring to FIGS. 1, 2 and 10, after the facial image search is performed, the image display region 404 includes the facial image 206 and the similarity score box 640. The computer 30 performs the facial image search based on the facial images 200, 204 (shown in FIG. 9) and retrieves the facial image 206 based on the attributes in the facial images 200, 204. Further, the similarly score box 640 indicates a weighted average similarity score of the facial image 206.

Referring to FIGS. 1, 2 and 11-13, a flowchart of a first method for searching for facial images utilizing the facial images retrieval system 20 will be explained. For purposes of simplicity, the first method will be explained utilizing three facial images. However, it should be understood that the first method could be implemented with numerous facial images and determine numerous similarity scores to determine the facial images with the highest similarity scores and to display such facial images.

At step 520, the computer 30 executes the input graphical user interface (GUI) 100, the pre-processing module 102, the natural language processing (NLP) module 104, the first computer vision computational neural network 108, the second computer vision computational neural network 110, and the similarity scorer module 106. After step 520, the method advances to step 524.

At step 524, the image database 40 stores facial images 200, 204, 206 therein. After step 524, the method advances to step 526.

At step 526, the input GUI 100 on the display device 60 receives a first textual description of a facial image and sends the first textual description to the pre-processing module 102. After step 526, the method advances to step 528.

At step 528, the pre-processing module 102 performs tokenization of the first textual description to obtain a first list of textual words that are sent to the NLP module 104. After step 528, the method advances to step 530.

At step 530, the NLP module 104 generates a first textual feature vector descriptor 180 (shown in FIG. 180) based on the first list of textual words. The first textual feature vector descriptor 180 is sent to the similarity scorer module 106. At step 530, the method advances to step 532.

At step 532, the similarity scorer module 106 determines a first similarity score between the first textual feature vector descriptor 180 (shown in FIG. 28) and a first master feature vector descriptor 300 (shown in FIG. 3) associated with the facial image 200, utilizing a following equation: first similarity score=f(first textual feature vector descriptor, first master feature vector descriptor), wherein f corresponds to a similarity function. The first master feature vector descriptor 300 is generated by the second computer vision computational neural network 110 utilizing the facial image 200 and is stored in an embedding database 45. After step 532, the method advances to step 540.

At step 540, the similarity scorer module 106 determines a second similarity score between the first textual feature vector descriptor 180 (shown in FIG. 28) and a second master feature vector descriptor 304 associated with the facial image 204, utilizing a following equation: second similarity score=f(first textual feature vector descriptor, second master feature vector descriptor), wherein f corresponds to a similarity function. The second master feature vector descriptor 304 is generated by the second computer vision computational neural network 110 utilizing the second facial image and is stored in the embedding database 45. After step 540, the method advances to step 542.

At step 542, the computer 30 instructs the display device 60 to display the facial images 200, 204 and the first and second similarity scores thereon. After step 542, the method advances to step 544.

At step 544, the input GUI 100 receives a user selection for the facial images 200, 204 to perform further facial image searches, and sends the facial images 200, 204 to the pre-processing module 102. The input GUI 100 further receives a user selection for first and second weighting values associated with the facial images 200, 204, respectively. After step 544, the method advances to step 546.

At step 546, the pre-processing module 102 normalizes and aligns the facial image 200 to obtain at a first pre-processed facial image, and normalizes and aligns the facial image 204 to obtain at a second pre-processed facial image sends the first and second pre-processed facial images to the first computer vision computational neural network 108. After step 546, the method advances to step 560.

At step 560, the first computer vision computational neural network 108 generates third and fourth master feature vector descriptors based on the first and second pre-processed facial images, respectively, and sends the third and fourth master feature vector descriptors to the similarity scorer module 106. After step 560, the method advances to step 562.

At step 562, the similarity scorer module 106 determines a third similarity score between the third master feature vector descriptor and a fifth master feature vector descriptor 306 associated with a facial image 206, utilizing a following equation: third similarity score=f(third master feature vector descriptor, a fifth master feature vector descriptor), wherein f corresponds to a similarity function. The fifth master feature vector descriptor is generated by the first computer vision computational neural network 108 and is stored in the embedding database 45. After step 562, the method advances to step 564.

At step 564, the similarity scorer module 106 determines a fourth similarity score between the fourth master feature vector descriptor and the fifth master feature vector descriptor associated with the facial image 206 utilizing a following equation: fourth similarity score=f(fourth master feature vector descriptor, fifth master feature vector descriptor), wherein f corresponds to a similarity function. After step 564, method advances to step 566.

At step 566, the similarity scorer module 106 calculates a weighted average of at least the third and fourth similarity scores to determine a final similarity score of the facial image 206, utilizing the following equation: final similarity score=(first weighting value×third similarity score)+(second weighting value×fourth similarity score)/2. After step 566, the method advances to step 568.

At step 568, the computer 30 instructs the display device 60 to display the facial image 206 and the final similarity score thereon.

Referring to FIGS. 14-17, a description of the input GUI 100 for implementing a second method for searching for facial images utilizing the facial images retrieval system 20 will be explained. During the second method, the input GUI 100 receives an initial textual description of a facial image to perform an initial facial image search to obtain a plurality of facial images based on the textual description, and then receives user instructions to modify one of the facial images to obtain a modified facial image that is closer to a desired image, and to perform a further facial image search based on the modified facial image to obtain another facial image.

Figure 14:
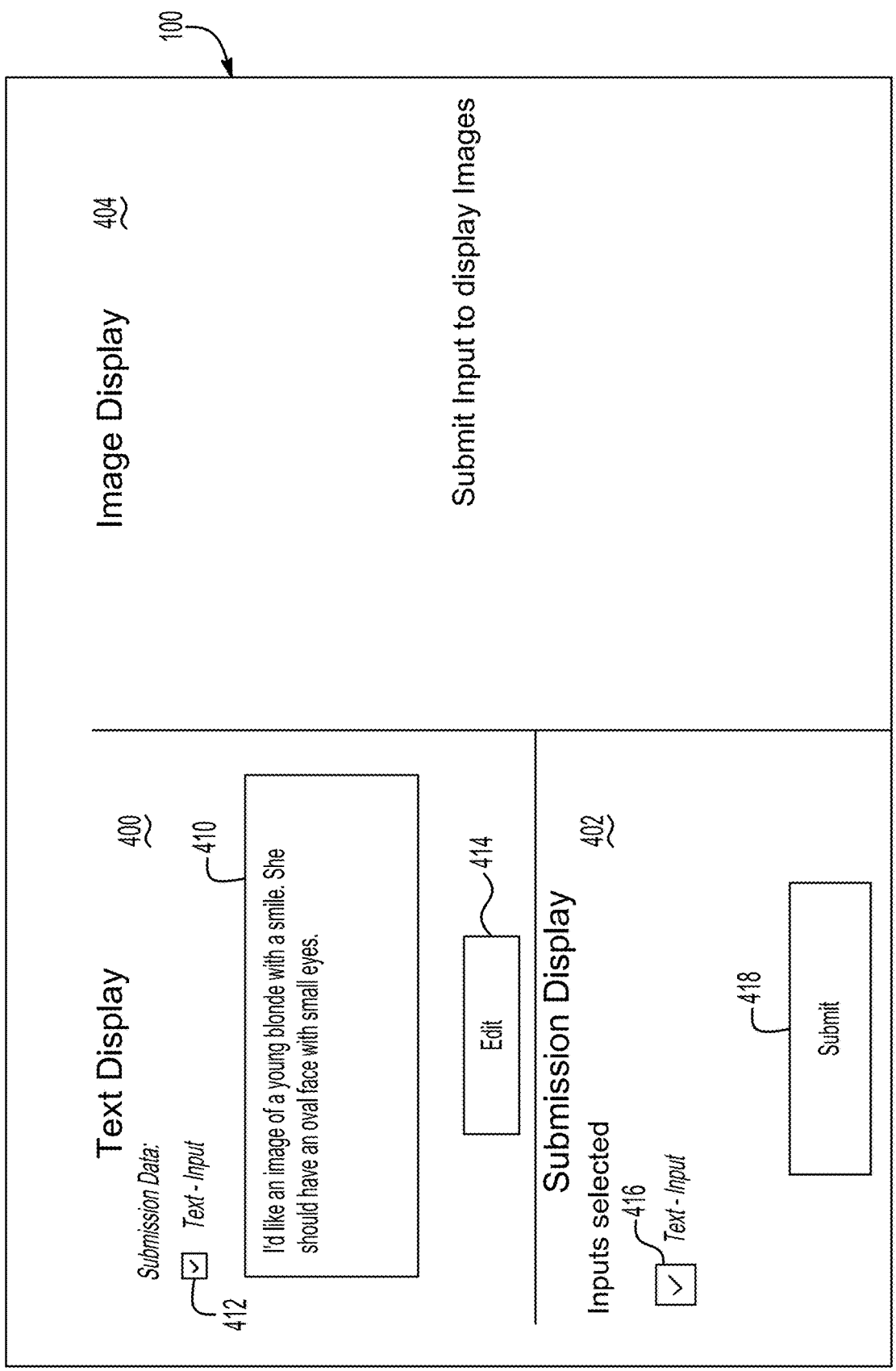
FIG. 14 is a schematic of the graphical user interface utilized by the system of FIG. 1 for implementing a second method for searching for facial images.

Referring to FIG. 14, the text display region 400 includes a text input box 410, a text selection checkbox 412, and an edit command button 414. The text input box 410 indicates the user entered the textual description for a desired image as: "I'd like an image of a young blonde with a smile. She should have an oval face with small eyes." When the user selects the submit command button 418, the computer 30 performs the facial image search.

Figure 15:
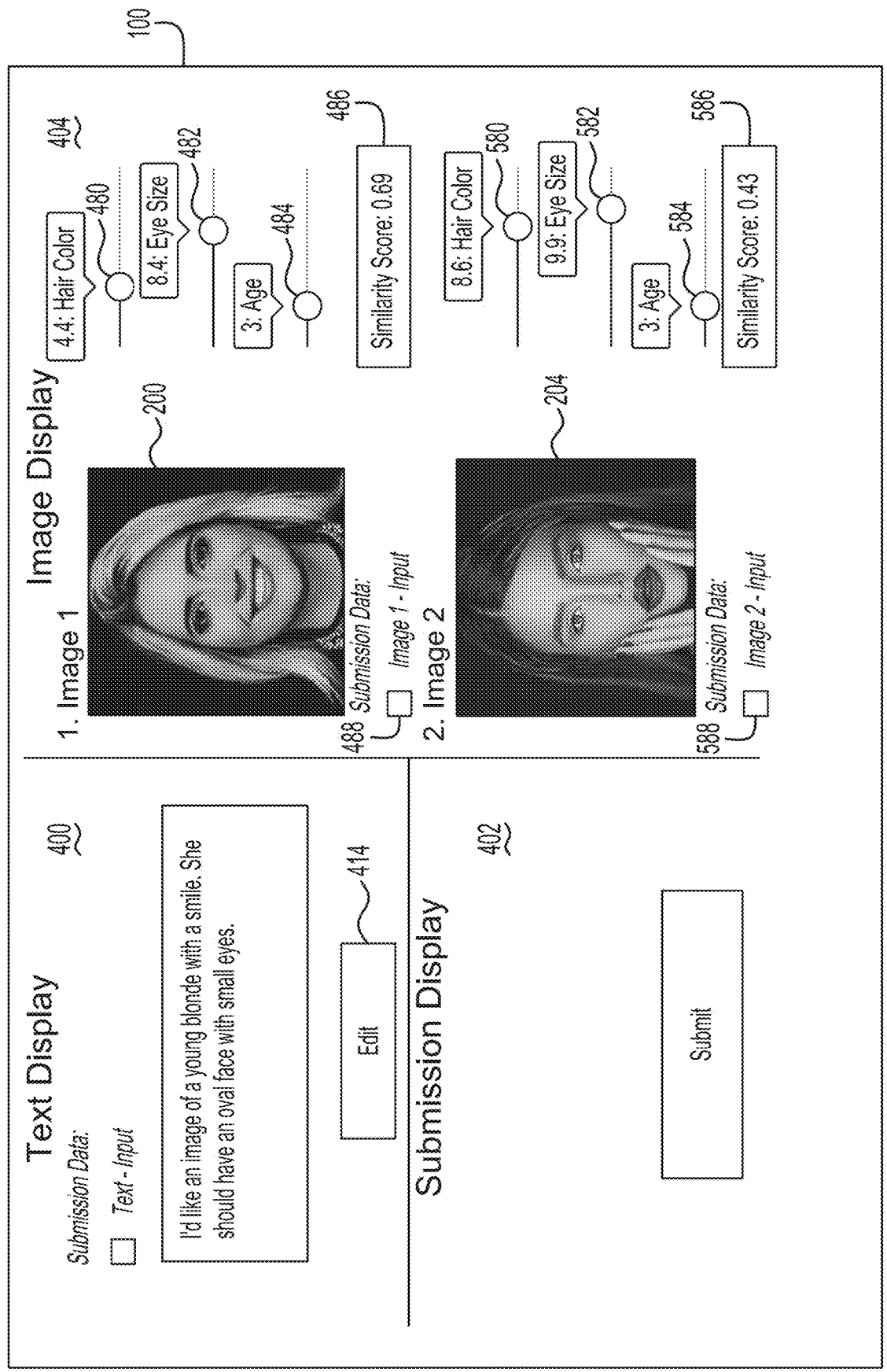
FIG. 15 is another schematic of the graphical user interface of FIG. 14.

Referring to FIG. 15, the image display region 404 displays the facial images 200, 204 which were found in the facial image search.

Figure 16:
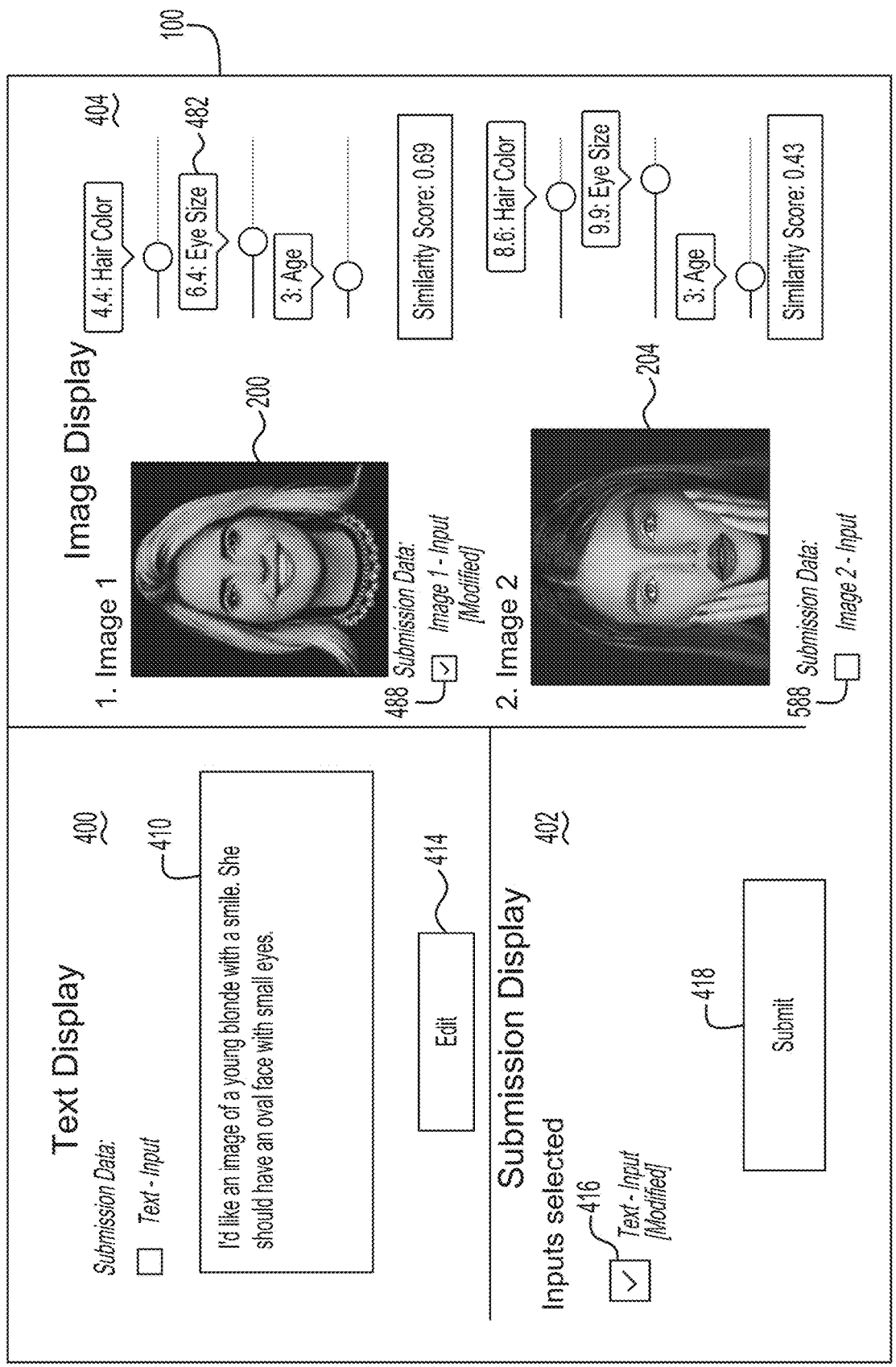
FIG. 16 is another schematic of the graphical user interface of FIG. 14.

Referring to FIG. 16, the user has utilized the eye size adjustment slider 482 to adjust the eye size in the facial image 200 (shown in FIG. 15) to obtain a modified facial image 204 (shown in FIG. 16). Further, the image selection checkbox 488 has been selected to indicate that the modified facial image 204 will be utilized for further facial image searching. When the user selects the submit command button 418, the computer 30 performs the refined facial image search.

Figure 17:
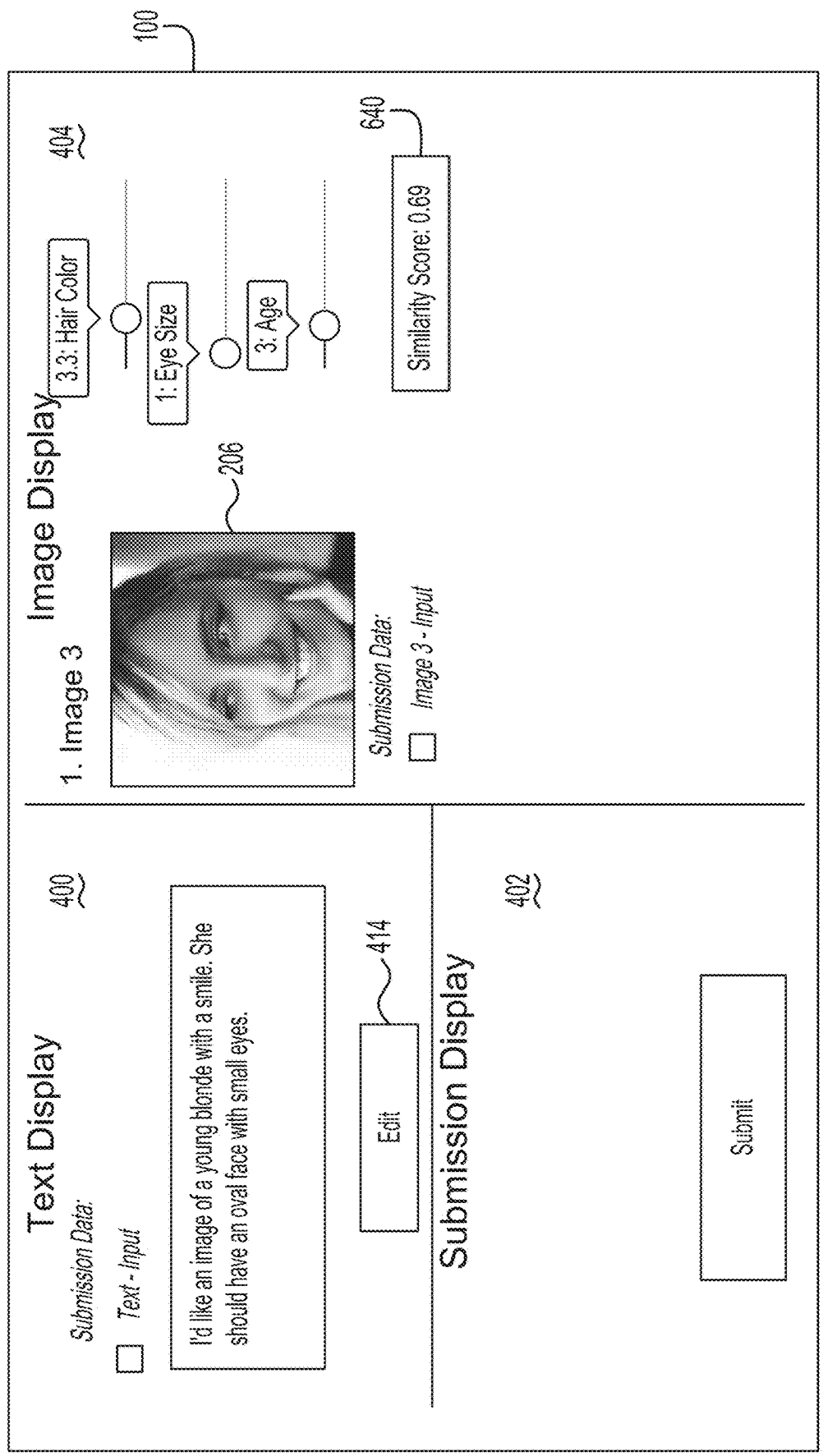
FIG. 17 is another schematic of the graphical user interface of FIG. 14.
Figure 18:
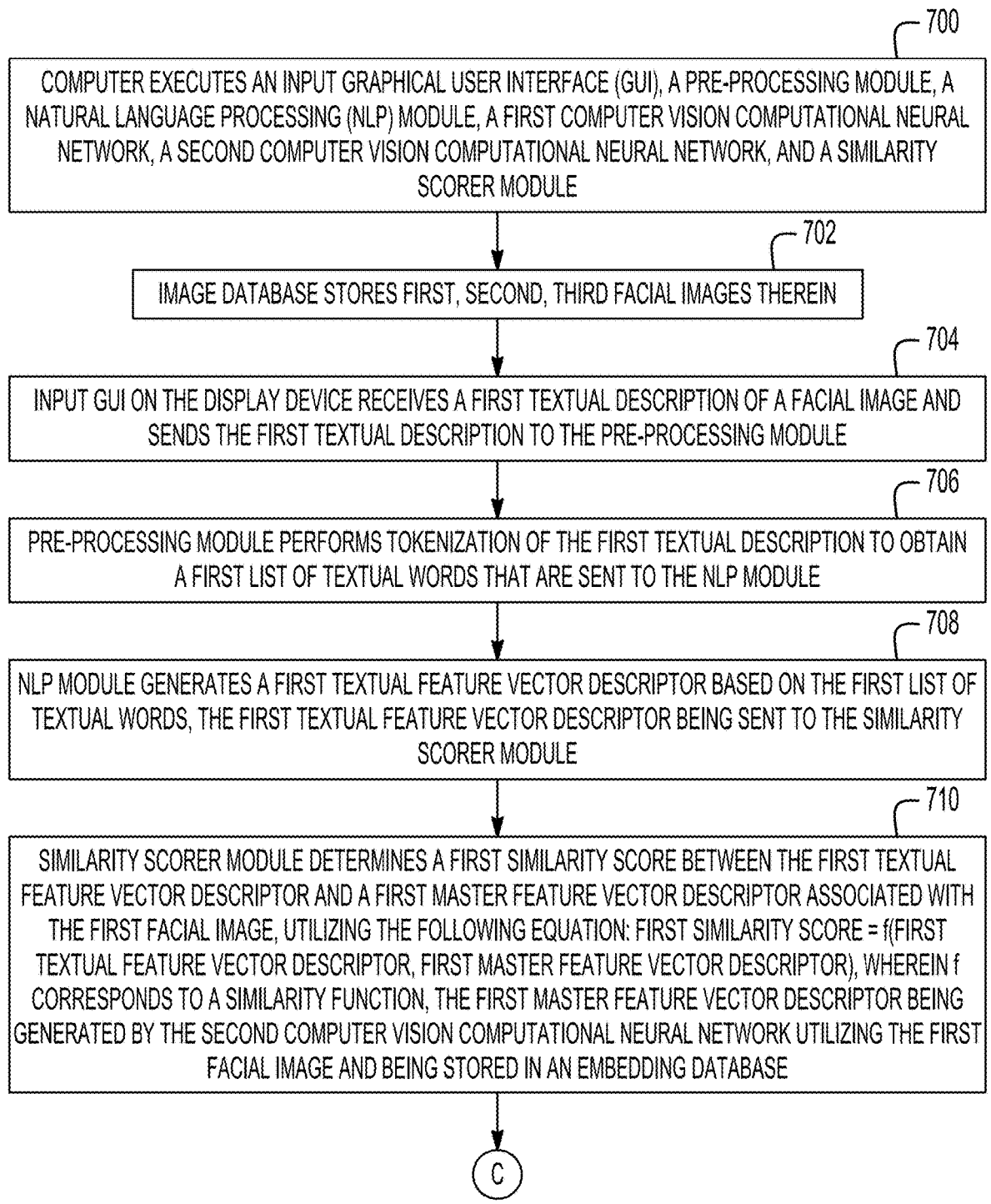
FIGS. 18-20 are flowcharts of a second method for searching for facial images utilizing the facial images retrieval system of FIG. 1.
Figure 19:
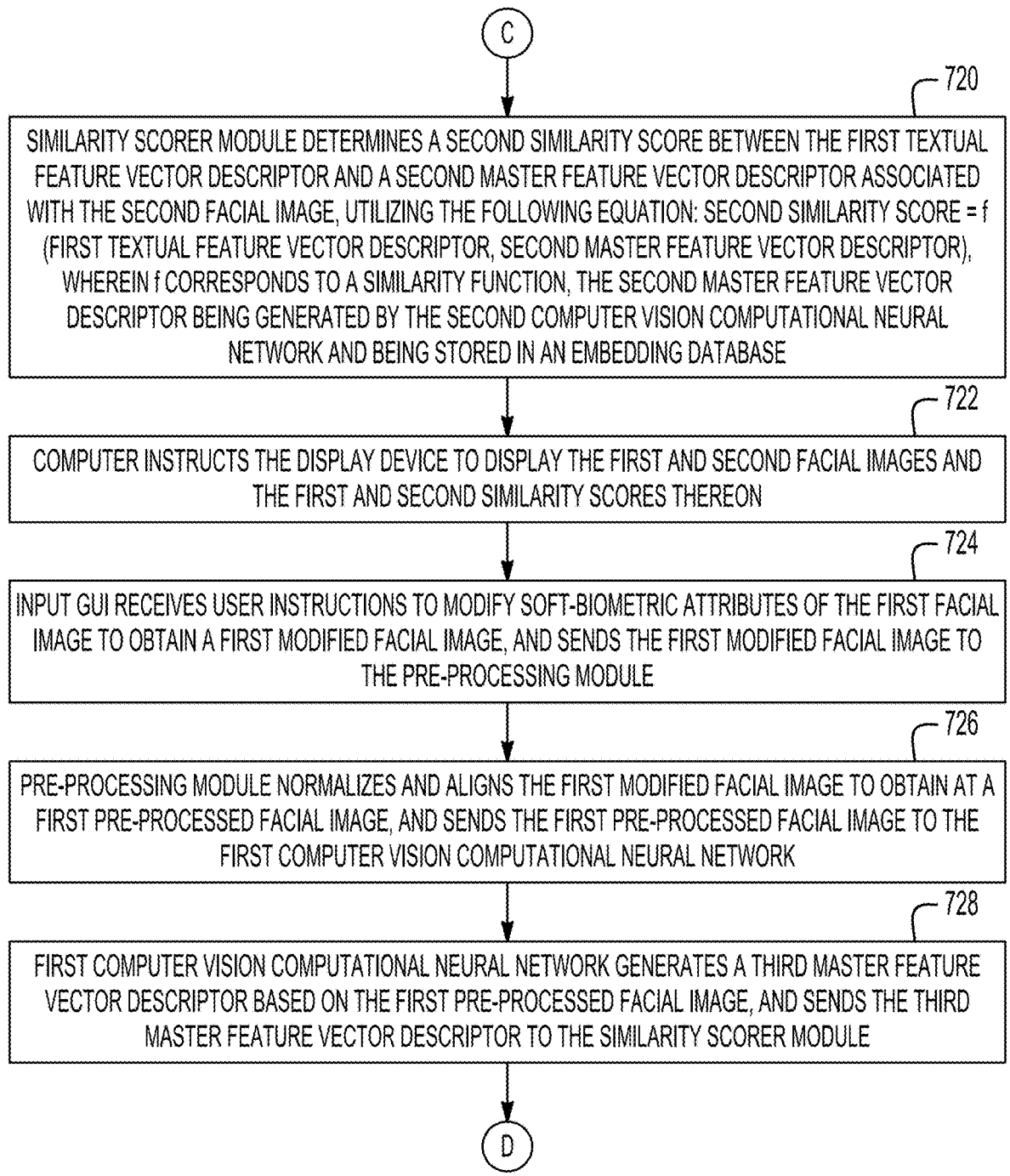
Figure 20:
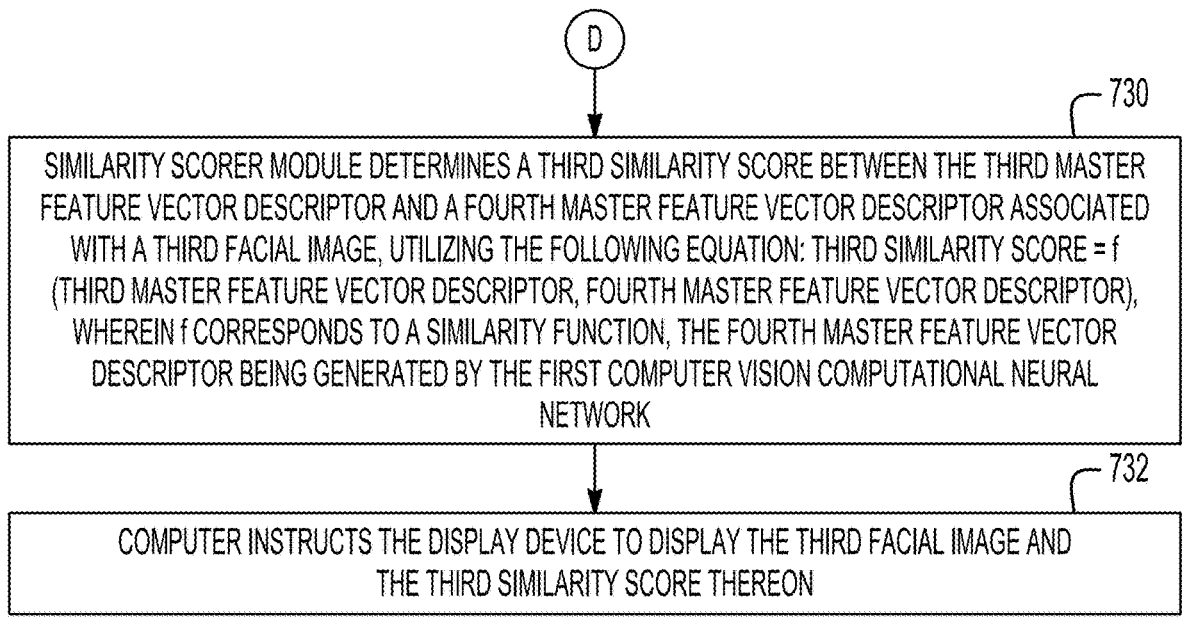

Referring to FIG. 17, the image display region 404 displays the facial image 206 which was found in the refined facial image search based on the modified facial image 204. Further, the similarity score box 640 indicates a similarity score for the facial image 206.

Referring to FIGS. 1, 2 and 18-20, a flowchart of a second method for searching for facial images utilizing the facial images retrieval system 20 will be explained. For purposes of simplicity, the second method will be explained utilizing three facial images. However, it should be understood that the second method could be implemented with numerous facial images and determine numerous similarity scores to determine the facial images with the highest similarity scores and to display such facial images.

At step 700, the computer 30 executes the input graphical user interface (GUI) 100, the pre-processing module 102, the natural language processing (NLP) module, the first computer vision computational neural network 108, the second computer vision computational neural network 110, and the similarity scorer module 106. After step 700, the method advances to step 702.

At step 702, the image database 40 stores first, second, and third facial images 200, 204, 206 therein. After step 702, the method advances to step 704.

At step 704, the input GUI 100 on the display device 60 receives a first textual description of a facial image and sends the first textual description to the pre-processing module 102. After step 704, the method advances to step 706.

At step 706, the pre-processing module 102 performs tokenization of the first textual description to obtain a first list of textual words that are sent to the NLP module 104. After step 706, the method advances to step 708.

At step 708, the NLP module 104 generates a first textual feature vector descriptor 180 (shown in FIG. 28) based on the first list of textual words. The first textual feature vector descriptor 180 is sent to the similarity scorer module 106. After step 708, the method advances to step 710.

At step 710, the similarity scorer module 106 determines a first similarity score between the first textual feature vector descriptor 180 (shown in FIG. 28) and a first master feature vector descriptor 300 (shown in FIG. 3) associated with the facial image 200 utilizing a following equation: first similarity score=f(first textual feature vector descriptor, first master feature vector descriptor), wherein f corresponds to a similarity function. The first master feature vector descriptor 300 is generated by the second computer vision computational neural network 110 and is stored in an embedding database 45. After step 710, the method advances to step 720.

At step 720, the similarity scorer module 106 determines a second similarity score between the first textual feature vector descriptor 180 (shown in FIG. 28) and a second master feature vector descriptor 304 (shown in FIG. 5) associated with the facial image 204, utilizing a following equation: second similarity score=f(first textual feature vector descriptor, second master feature vector descriptor), wherein f corresponds to a similarity function. The second master feature vector descriptor 304 is generated by the second computer vision computational neural network 110 and is stored in an embedding database 45. After step 720, the method advances to step 722.

At step 722, the computer 30 instructs the display device 60 to display the facial images 200, 204 and the first and second similarity scores thereon. After step 722, the method advances to step 724.

At step 724, the input GUI 100 receives user instructions to modify soft-biometric attributes of the facial image 200 (shown in FIG. 15) to obtain a first modified facial image 204 (shown in FIG. 16), and sends the first modified facial image 204 to the pre-processing module 102. After step 724, the method advances to step 726.

At step 726, the pre-processing module 102 normalizes and aligns the first modified facial image 204 (shown in FIG. 16) to obtain at a first pre-processed facial image, and sends the first pre-processed facial image to the first computer vision computational neural network 108. After step 726, method advances to step 728.

At step 728, the first computer vision computational neural network 108 generates a third master feature vector descriptor based on the first pre-processed facial image, and sends the third master feature vector descriptor to the similarity scorer module 106. After step 728, the method advances to step 730.

At step 730, the similarity scorer module 106 determines a third similarity score between the third master feature vector descriptor and a fourth master feature vector descriptor 306 (shown in FIG. 6) associated with a facial image 206, utilizing a following equation: third similarity score=f(third master feature vector descriptor, fourth master feature vector descriptor), wherein f corresponds to a similarity function. The fourth master feature vector descriptor is generated by the first computer vision computational neural network 108. After step 730, the method advances to step 732.

At step 732, the computer 30 instructs the display device 60 to display the facial image 206 and the third similarity score thereon.

Referring to FIGS. 21-24, a description of the input GUI 100 for implementing a third method for searching for facial images utilizing the facial images retrieval system 20 will be explained. During the third method, the input GUI 100, the input GUI 100 receives an initial textual description of a facial image to perform an initial facial image search to obtain a plurality of facial images based on the textual description, and then receives a modified textual description and a selection of one of the facial images to perform a further facial image search to obtain another facial image.

Figure 21:
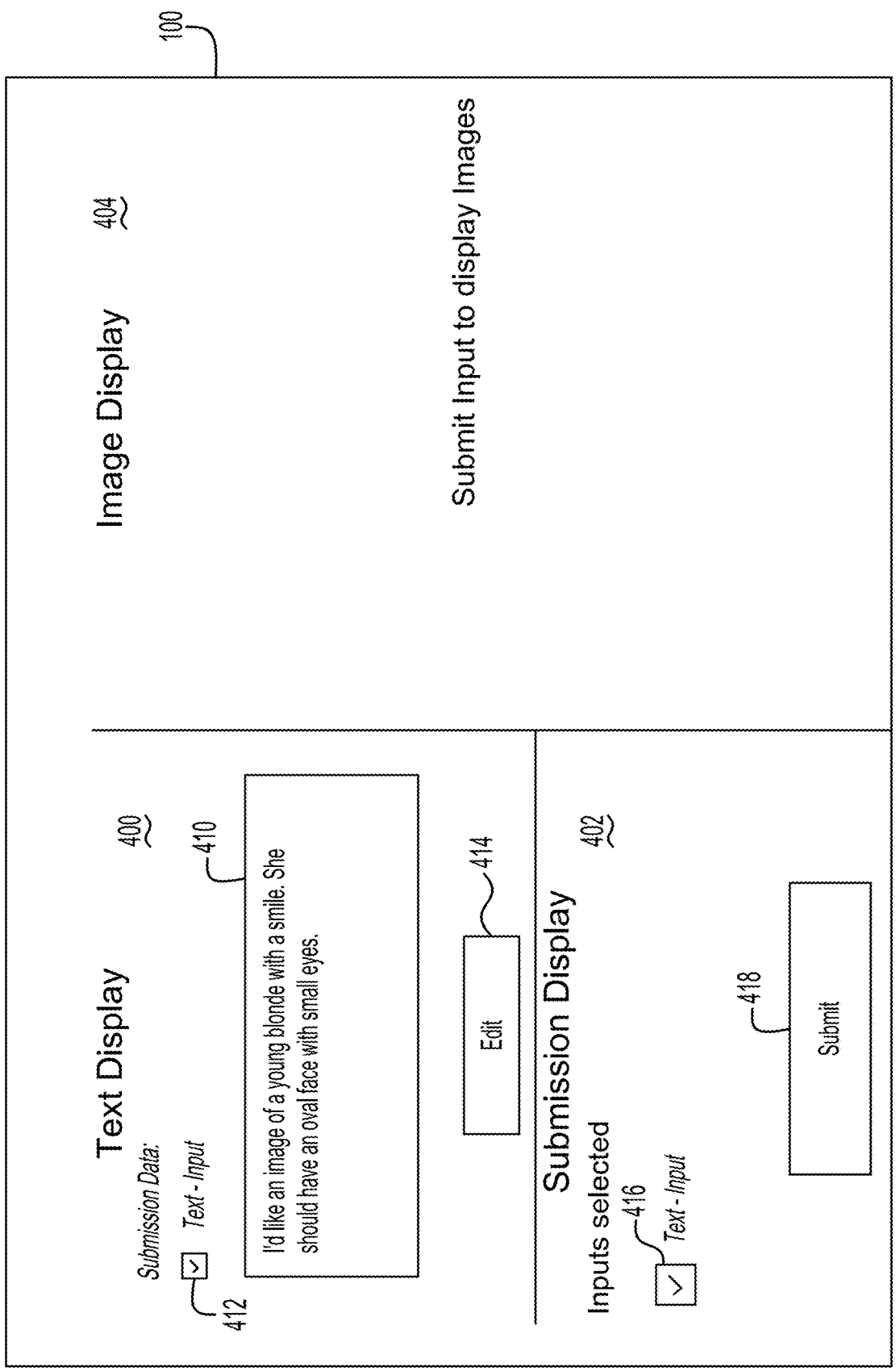
FIG. 21 is a schematic of the graphical user interface utilized by the system of FIG. 1 for implementing a third method for searching for facial images.

Referring to FIG. 21, the text display region 400 includes a text input box 410, a text selection checkbox 412, and an edit command button 414. The text input box 410 indicates the user entered the textual description for a desired image as: "I'd like an image of a young blonde with a smile. She should have an oval face with small eyes." When the user selects the submit command button 418, the computer 30 performs the facial image search.

Figure 22:
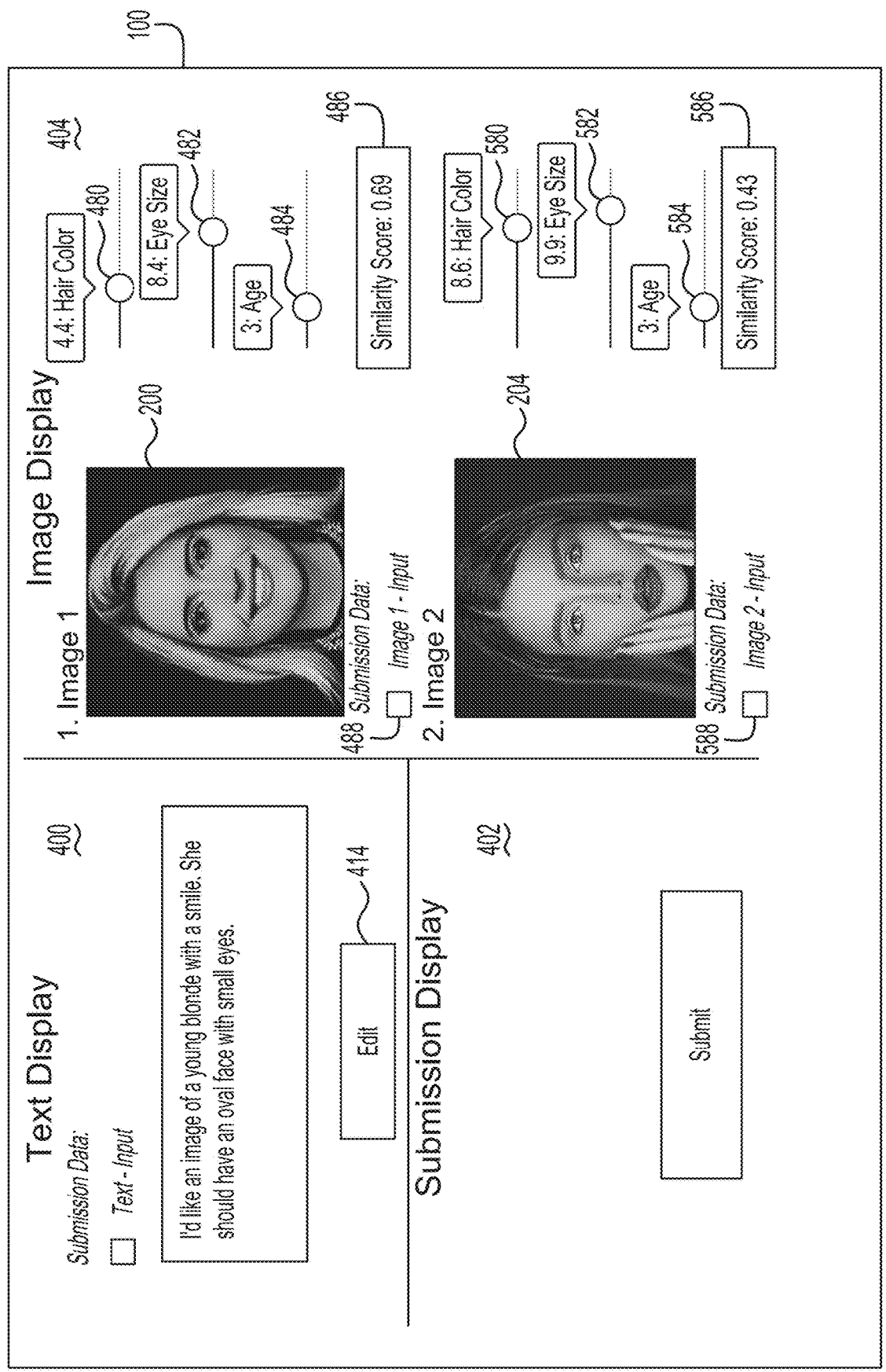
FIG. 22 is another schematic of the graphical user interface of FIG. 21.

Referring to FIG. 22, the image display region 404 displays the facial images 200, 204 which were found in the facial image search.

Figure 23:
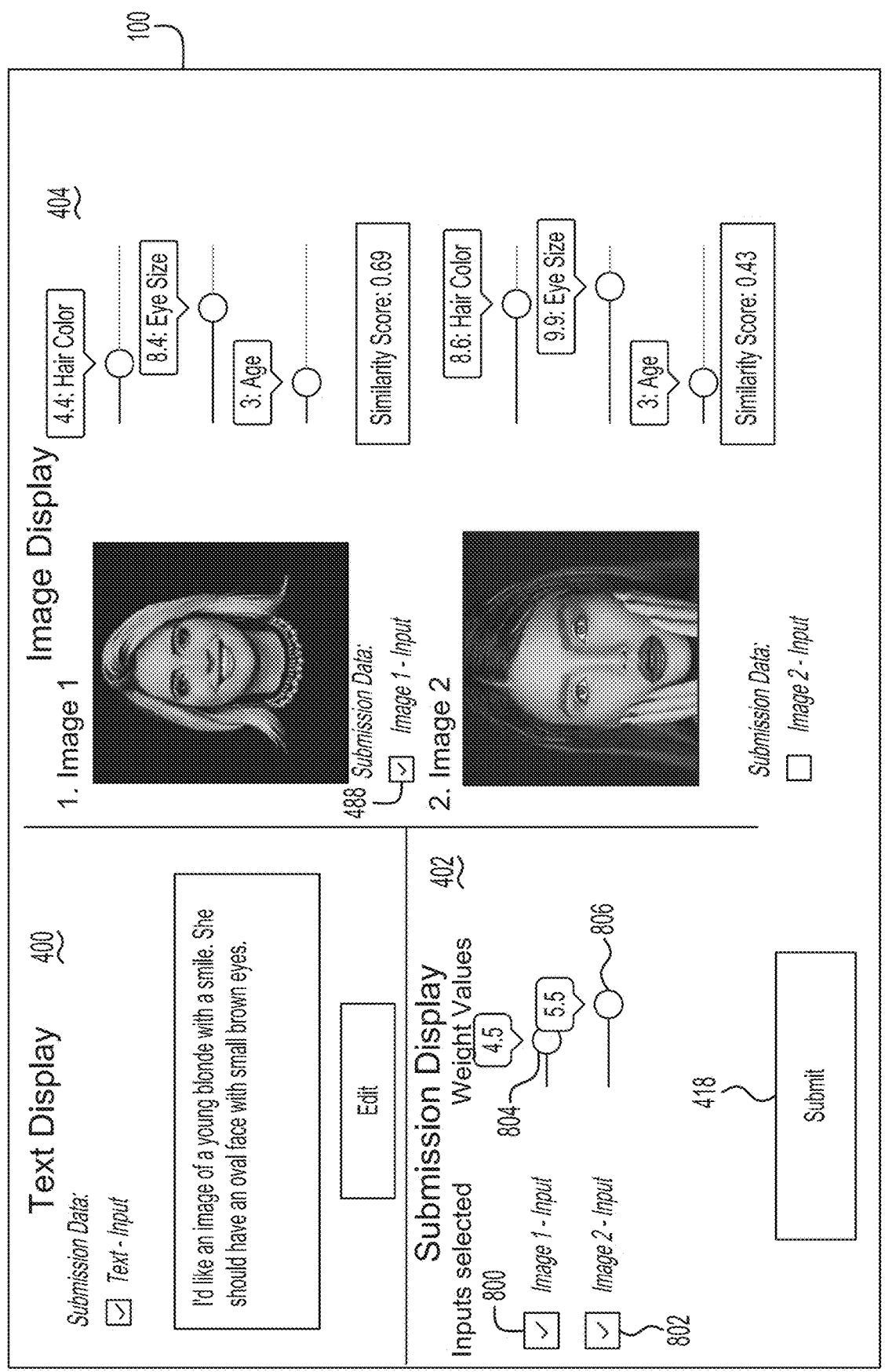
FIG. 23 is another schematic of the graphical user interface of FIG. 21.

Referring to FIG. 23, the user has selected the image selection checkbox 488 for performing further facial image searching. The user has further selected the text selection checkbox 412 indicating that the modified textual description in the text input box 410 should also be utilized for further facial image searching. The weighting value adjustment slider 804 allows the user to select the weighting value that will be assigned to the modified textual description in textual input box 410 for determining a weighted average similarity score. The weighting value slider 806 allows the user to select the weighting value to be assigned to be facial image 200 for determining the weighted average similarity score. When the user selects the submit command button 418, the computer 30 performs the refined facial image search.

Figure 24:
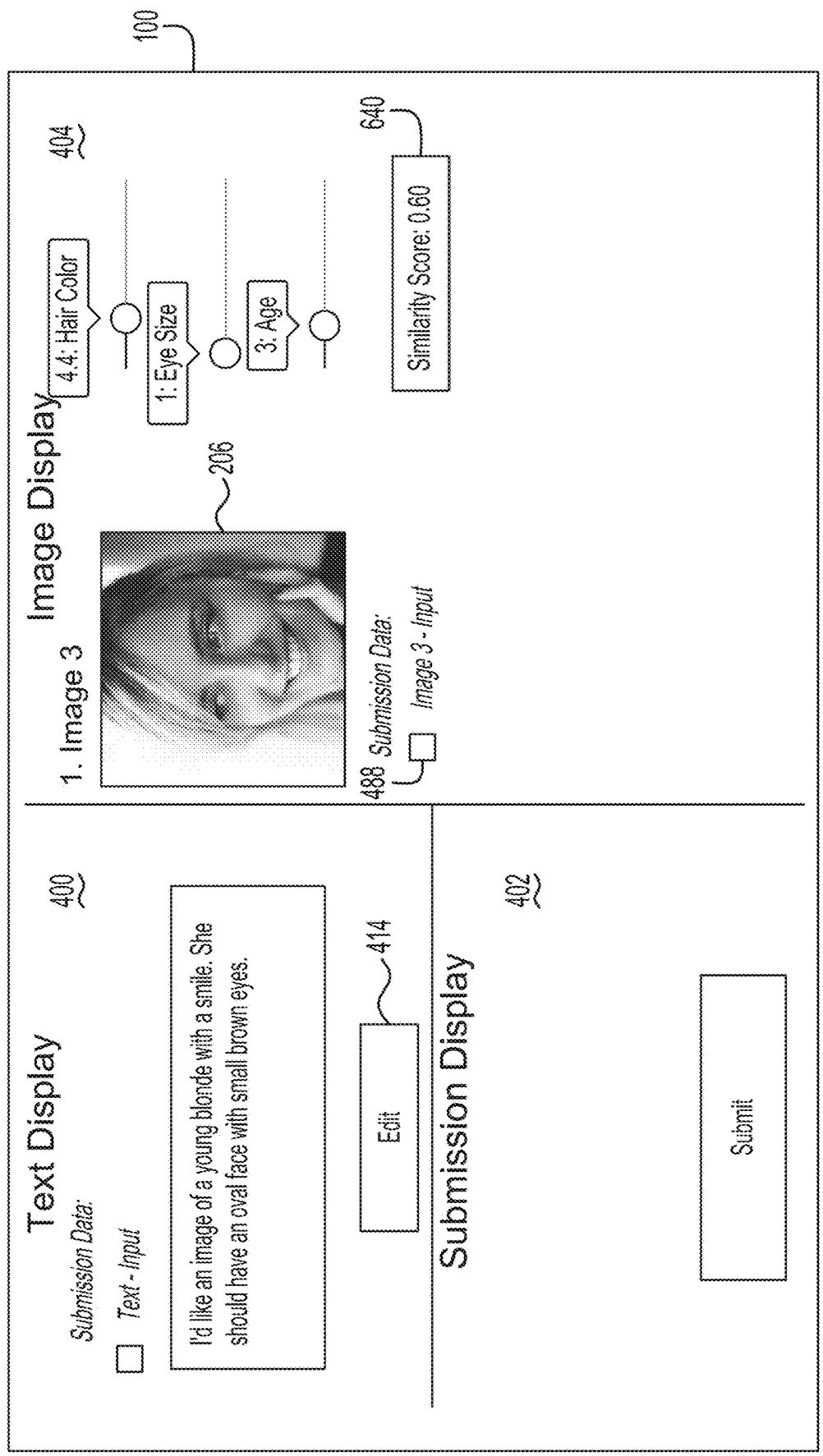
FIG. 24 is another schematic of the graphical user interface of FIG. 21.
Figure 25:
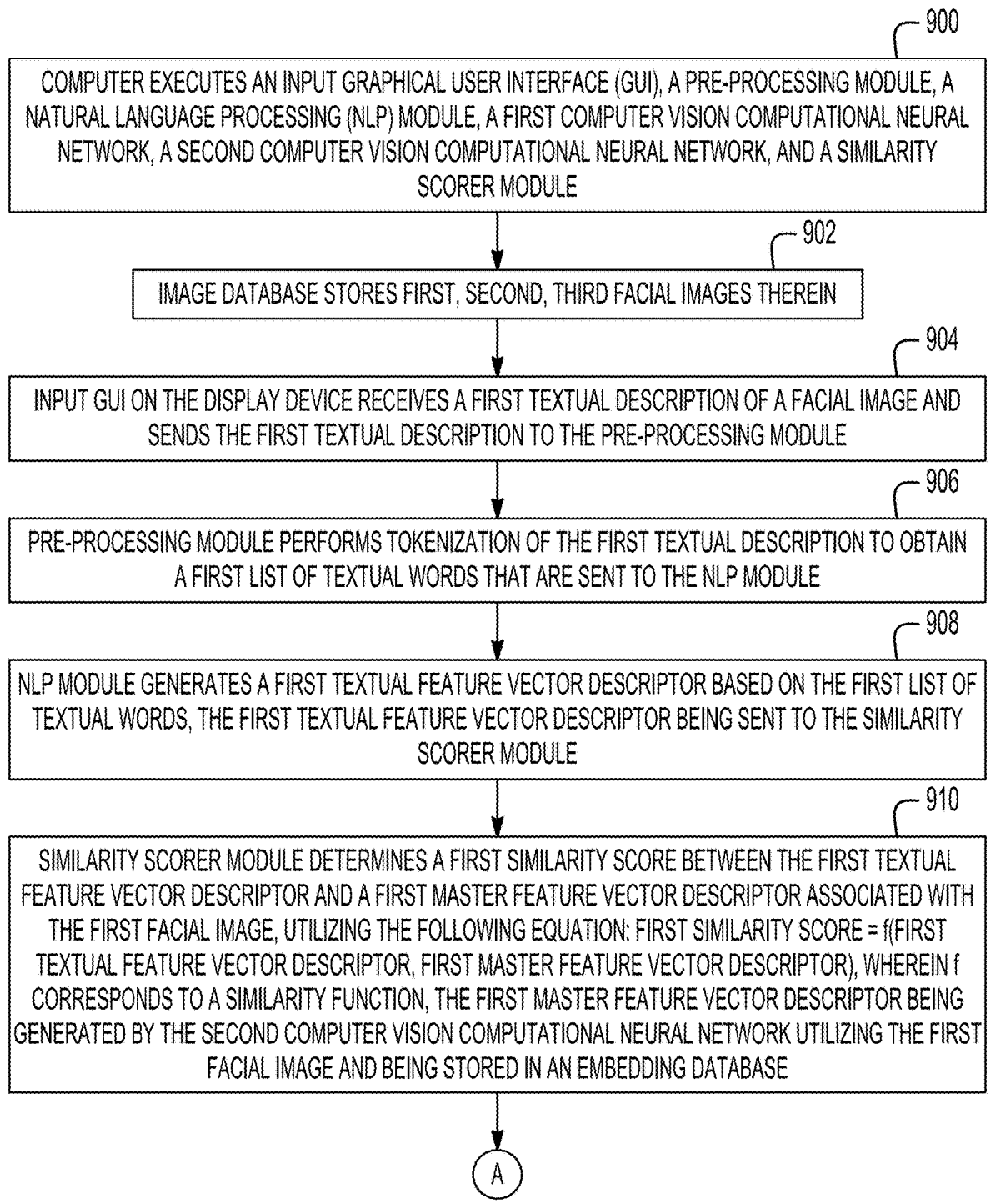
FIGS. 25-27 are flowcharts of a third method for searching for facial images utilizing the facial images retrieval system of FIG. 1.
Figure 26:
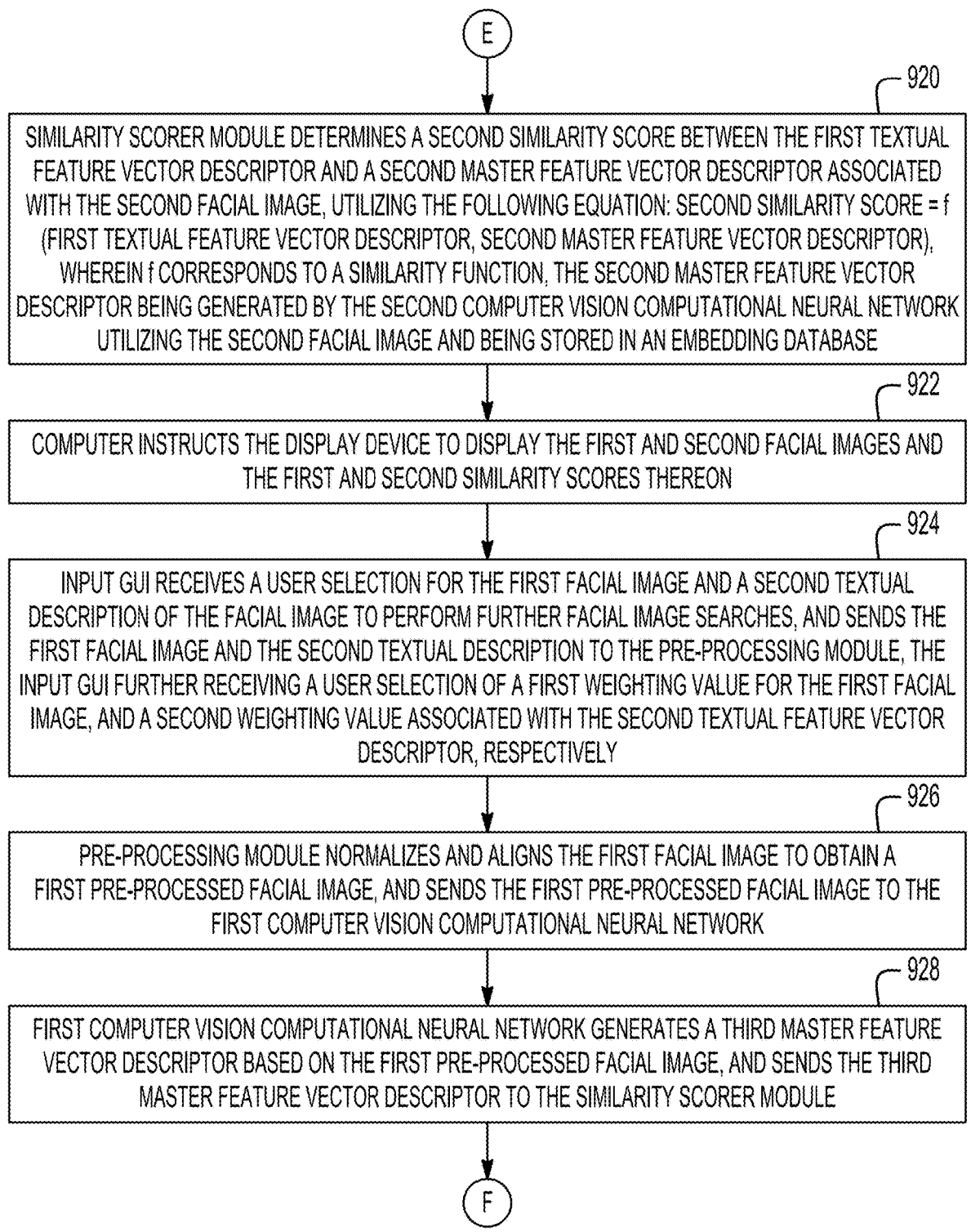
Figure 27:
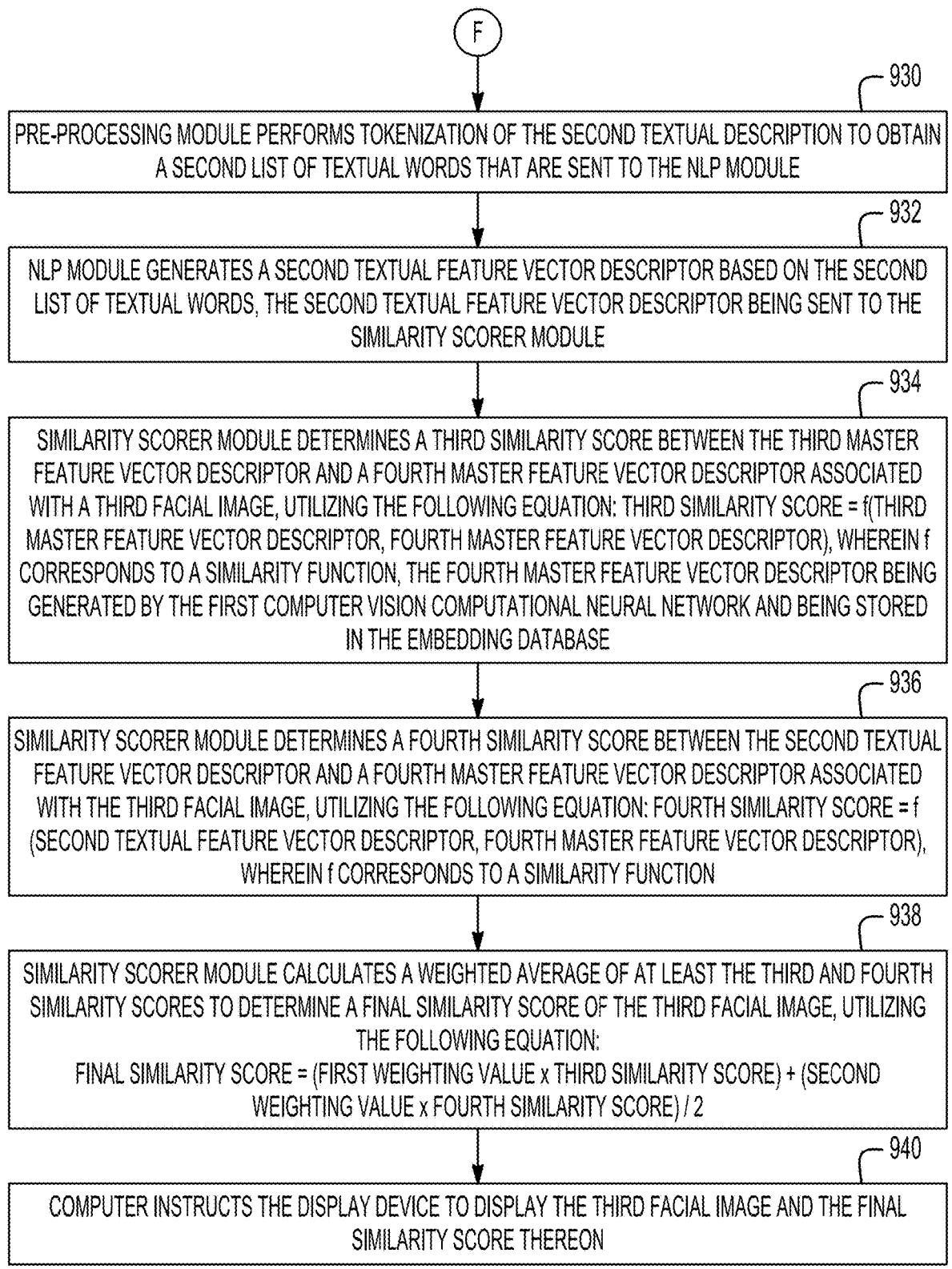

Referring to FIG. 24, the image display region 404 displays the facial image 206 which was found in the facial image search based on the facial image 200 and the modified textual description. Further, the similarity score box 640 indicates a similarity score for the facial image 206.

Referring to FIGS. 1, 2 and 25-27, a flowchart of a third method for searching for facial images utilizing the facial images retrieval system 20 will be explained. For purposes of simplicity, the third method will be explained utilizing three facial images. However, it should be understood that the third method could be implemented with numerous facial images and determine numerous similarity scores to determine the facial images with the highest similarity scores and to display such facial images.

At step 900, the computer 30 executes the input graphical user interface (GUI), the pre-processing module 102, the natural language processing (NLP) module, the first computer vision computational neural network 108, the second computer vision computational neural network 110, and the similarity scorer module 106. After step 900, method advances to step 902.

At step 902, the image database 40 stores first, second, and third facial images 200, 204, 206 therein. After step 902, method advances to step 904.

At step 904, the input GUI 100 on the display device 60 receives a first textual description of a facial image and sends the first textual description to the pre-processing module 102. After step 904, the method advances to step 906.

At step 906, the pre-processing module 102 performs tokenization of the first textual description to obtain a first list of textual words that are sent to the NLP module 104. After step 906, the method advances to step 908.

At step 908, the NLP module 104 generates a first textual feature vector descriptor 180 (shown in FIG. 28) based on the first list of textual words. The first textual feature vector descriptor 180 is sent to the similarity scorer module 106. After step 908, the method advances to step 910.

At step 910, the similarity scorer module 106 determines a first similarity score between the first textual feature vector descriptor 180 (shown in FIG. 28) and a first master feature vector descriptor 300 (shown in FIG. 3) associated with the facial image 200, utilizing a following equation: first similarity score=f(first textual feature vector descriptor, first master feature vector descriptor), wherein f corresponds to a similarity function. The first master feature vector descriptor 300 is generated by the second computer vision computational neural network 110 utilizing the first facial image and is stored in an embedding database 45. After step 910, the method advances to step 920.

At step 920, the similarity scorer module 106 determines a second similarity score between the first textual feature vector descriptor 180 (shown in FIG. 28) and a second master feature vector descriptor 304 (shown in FIG. 5) associated with the facial image 204, utilizing a following equation: second similarity score=f(first textual feature vector descriptor, second master feature vector descriptor), wherein f corresponds to a similarity function. The second master feature vector descriptor 304 is generated by the second computer vision computational neural network 110 utilizing the second facial image and is stored in the embedding database 45. After step 920, the method advances to step 922.

At step 922, the computer 30 instructs the display device 60 to display the facial images 200, 204 and the first and second similarity scores thereon. After step 922, the method advances to step 924.

At step 924, the input GUI 100 receives a user selection for the facial image 200 and a second textual description of the facial image to perform further facial image searches, and sends the facial image 200 and the second textual description to the pre-processing module 102. The input GUI 100 further receives a user selection of a first weighting value for the facial image 200, and a second weighting value associated with the second textual feature vector descriptor, respectively. After step 924, the method advances to step 926.

At step 926, the pre-processing module 102 normalizes and aligns the facial image 200 to obtain at a first pre-processed facial image, and sends the first pre-processed facial images to the first computer vision computational neural network 108. After step 926, the method advances to step 928.

At step 928, the first computer vision computational neural network 108 generates a third master feature vector descriptor based on the first pre-processed facial image and sends the third master feature vector descriptor to the similarity scorer module 106. After step 928, the method advances to step 930.

At step 930, the pre-processing module 102 performs tokenization of the second textual description to obtain a second list of textual words that are sent to the NLP module 104. After step 930, the method advances to step 932.

At step 932, the NLP module 104 generates a second textual feature vector descriptor based on the second list of textual words. The second textual feature vector descriptor is sent to the similarity scorer module 106. After step 932, the method advances to step 934.

At step 934, the similarity scorer module 106 determines a third similarity score between the third master feature vector descriptor and a fourth master feature vector descriptor 306 (shown in FIG. 6) associated with the facial image 206, utilizing a following equation: third similarity score=f (third master feature vector descriptor, a fourth master feature vector descriptor), wherein f corresponds to a similarity function. The fourth master feature vector descriptor 306 is generated by the first computer vision computational neural network 108 and is stored in the embedding database 45. After step 934, the method advances to step 936.

At step 936, the similarity scorer module 106 determines a fourth similarity score between the second textual feature vector descriptor and the fourth master feature vector descriptor 306 (shown in FIG. 6) associated with the facial image 206, utilizing a following equation: fourth similarity score=f(second textual feature vector descriptor, fourth master feature vector descriptor), wherein f corresponds to a similarity function. After step 936, the method advances to step 938.

At step 938, the similarity scorer module 106 calculates a weighted average of at least the third and fourth similarity scores to determine a final similarity score of the third facial image, utilizing the following equation: final similarity score=(first weighting value×third similarity score)+(second weighting value×fourth similarity score)/2. After step 938, the method advances to step 940.

At step 940, the computer 30 instructs the display device 60 to display the facial image 206 and the final similarity score thereon.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. An image retrieval system, comprising:
 a display device;
 a computer operably coupled to the display device, the computer having an input graphical user interface (GUI), a pre-processing module, a natural language processing (NLP) module, and a similarity scorer module;
 the input GUI receiving a first textual description of a facial image;
 the pre-processing module performing tokenization of the first textual description to obtain a first list of textual words describing the facial image;
 the NLP module generating a first textual feature vector descriptor based on the first list of textual words describing the facial image, the first textual feature vector descriptor being sent to the similarity scorer module;
 the similarity scorer module determining a first similarity score between the first textual feature vector descriptor and a first master feature vector descriptor associated with a first facial image, the first master feature vector descriptor being generated by a first computer vision computational neural network utilizing the first facial image; and the similarity scorer module determining a second similarity score between the first textual feature vector descriptor and a second master feature vector descriptor associated with a second facial image; the second master feature vector descriptor being generated by the first computer vision computational neural network utilizing the second facial image;

the computer instructing the display device to display the first and second facial images thereon at a same time;

the computer receiving a user selection of the first and second facial images and first and second weighting values that are associated with the first and second facial images, respectively, to perform further facial image searching;

the computer determining a third similarity score associated with the first facial image and a third facial image, and a fourth similarity score associated with the second facial image and the third facial image;

the similarity scorer module calculating a weighted average of the third and fourth similarity scores utilizing the first and second weighting values to determine a final similarity score of the third facial image; and the computer instructing the display device to display the third facial image and the final similarity score thereon.

2. The facial images retrieval system of claim 1, wherein the computer instructing the display device to display the first and second facial images thereon comprises:

the computer instructing the display device to display the first and second facial images and the first and second similarity scores thereon.

3. The facial images retrieval system of claim 1, wherein the computer determining the third similarity score associated with the first facial image and the third facial image, and the fourth similarity score associated with the second facial image and the third facial image comprises:

the pre-processing module normalizing and aligning the first facial image to obtain at a first pre-processed facial image, and normalizing and aligning the second facial image to obtain at a second pre-processed facial image sending the first and second pre-processed facial images to a second computer vision computational neural network;

the second computer vision computational neural network generating third and fourth master feature vector descriptors based on the first and second pre-processed facial images, respectively, and sending the third and fourth master feature vector descriptors to the similarity scorer module;

the similarity scorer module determining the third similarity score between the third master feature vector descriptor and a fifth master feature vector descriptor associated with the third facial image, the fifth master feature vector descriptor being generated by the second computer vision computational neural network;

the similarity scorer module determining the fourth similarity score between the fourth master feature vector descriptor and the fifth master feature vector descriptor associated with the third facial image.

4. The facial images retrieval system of claim 1, wherein the similarity scorer module calculating the weighted average of the third and fourth similarity scores to determine the final similarity score of the third facial image, comprises the similarity scorer module calculating the weighted average utilizing a following equation:

final similarity score=(the first weighting value×the third similarity score)+(the second weighting value×the fourth similarity score)/2.

5. An image retrieval system, comprising:

a display device;

a computer operably coupled to the display device, the computer having an input graphical user interface (GUI), a pre-processing module, a natural language processing (NLP) module, and a similarity scorer module;

the input GUI receiving a first textual description of a facial image;

the pre-processing module performing tokenization of the first textual description to obtain a first list of textual words describing the facial image;

the NLP module generating a first textual feature vector descriptor based on the first list of textual words describing the facial image, the first textual feature vector descriptor being sent to the similarity scorer module;

the similarity scorer module determining a first similarity score between the first textual feature vector descriptor and a first master feature vector descriptor associated with a first facial image, the first master feature vector descriptor being generated by a first computer vision computational neural network utilizing the first facial image;

the similarity scorer module determining a second similarity score between the first textual feature vector descriptor and a second master feature vector descriptor associated with a second facial image; the second master feature vector descriptor being generated by the first computer vision computational neural network utilizing the second facial image;

the computer instructing the display device to display the first and second facial images thereon at a same time;

the computer receiving a user instruction to modify soft-biometric attributes of the first facial image to obtain a first modified facial image to perform further facial image searching;

the computer determining a third similarity score associated with the first modified facial image and a third facial image; and the computer instructing the display device to display the third facial image and the third similarity score thereon.

6. The facial images retrieval system of claim 5, wherein the computer instructing the display device to display the first and second facial images thereon comprises:

the computer instructing the display device to display the first and second facial images and the first and second similarity scores thereon.

7. The facial images retrieval system of claim 5, wherein the computer receiving the user instruction to modify soft-biometric attributes of the first facial image to obtain the first modified facial image to perform further facial image searching, comprises:

the input GUI receiving the user instruction to modify soft-biometric attributes of the first facial image to obtain the first modified facial image, and sending the first modified facial image to the pre-processing module.

8. The facial images retrieval system of claim 7, wherein the computer determining the third similarity score associated with the first modified facial image and the third facial image, comprises the pre-processing module normalizing and aligning the first modified facial image to obtain at a first pre-processed facial image, and sending the first pre-processed facial image to a second computer vision computational neural network;

the second computer vision computational neural network generating a third master feature vector descriptor based on the first pre-processed facial image, and sending the third master feature vector descriptor to the similarity scorer module;

the similarity scorer module determining a third similarity score between the third master feature vector descriptor and a fourth master feature vector descriptor associated with a third facial image, the fourth master feature vector descriptor being generated by the second computer vision computational neural network.

9. An image retrieval system, comprising:

a display device;

a computer operably coupled to the display device, the computer having an input graphical user interface (GUI), a pre-processing module, a natural language processing (NLP) module, and a similarity scorer module;

the input GUI receiving a first textual description of a facial image;

the pre-processing module performing tokenization of the first textual description to obtain a first list of textual words describing the facial image that are sent to the NLP module;

the NLP module generating a first textual feature vector descriptor based on the first list of textual words describing the facial image, the first textual feature vector descriptor being sent to the similarity scorer module;

the similarity scorer module determining a first similarity score between the first textual feature vector descriptor and a first master feature vector descriptor associated with a first facial image, the first master feature vector descriptor being generated by a first computer vision computational neural network utilizing the first facial image; and the similarity scorer module determining the second similarity score between the first textual feature vector descriptor and a second master feature vector descriptor associated with a second facial image; the second master feature vector descriptor being generated by the first computer vision computational neural network utilizing the second facial image;

the computer instructing the display device to display the first and second facial images thereon at a same time;

the computer receiving a user selection of the first facial image and a second textual description and first and second weighting values that are associated with the first facial image and the second textual description, respectively, to perform further facial image searching;

the computer determining a third similarity score associated with the first facial image and a third facial image, and a fourth similarity score associated with a second textual description and the third facial image;

the similarity scorer module calculating a weighted average of the third and fourth similarity scores utilizing the first and second weighting values to determine a final similarity score of the third facial image; and the computer instructing the display device to display the third facial image and the final similarity score thereon.

10. The facial images retrieval system of claim 9, wherein the computer instructing the display device to display the first and second facial images thereon comprises:

the computer instructing the display device to display the first and second facial images and the first and second similarity scores thereon.

11. The facial images retrieval system of claim 9, wherein the computer receiving the user selection of the first facial image and the second textual description to perform further facial image searching comprises:

the input GUI receiving the user selection for the first facial image and the second textual description of the facial image to perform further facial image searches, and sending the first facial image and the second textual description to the pre-processing module, the input GUI further receiving the user selection of the first weighting value for the first facial image, and the second weighting value associated with a second textual feature vector associated with the second textual description, respectively.

12. The facial images retrieval system of claim 11, wherein the computer determining the third similarity score associated with the first facial image and the third facial image, and the fourth similarity score associated with the second textual description and the third facial image comprises:

the pre-processing module normalizing and aligning the first facial image to obtain at a first pre-processed facial image and sends the first pre-processed facial image to a second computer vision computational neural network;

the second computer vision computational neural network generating a third master feature vector descriptor based on the first pre-processed facial image, and sends the third master feature vector descriptor to the similarity scorer module;

the similarity scorer module determining the third similarity score between the third master feature vector descriptor and a fourth master feature vector descriptor associated with the third facial image, the fourth master feature vector descriptor being generated by the second computer vision computational neural network;

the pre-processing module performing tokenization of the second textual description to obtain a second list of textual words that are sent to the NLP module;

the NLP module generating the second textual feature vector descriptor based on the second list of textual words, the second textual feature vector descriptor being sent to the similarity scorer module; and the similarity scorer module determines a fourth similarity score between the second textual feature vector descriptor and the fourth master feature vector descriptor associated with the third facial image.

13. The facial images retrieval system of claim 12, wherein the similarity scorer module calculating the weighted average of the third and fourth similarity scores to determine the final similarity score of the third facial image, comprises the similarity scorer module calculating the weighted average utilizing a following equation:

the final similarity score=(the first weighting value× third similarity score)+(the second weighting value×the fourth similarity score)/2.

* * * * *